United States Patent
Okada et al.

(10) Patent No.: US 10,695,830 B2
(45) Date of Patent: *Jun. 30, 2020

(54) COPPER POWDER, COPPER PASTE USING SAME, CONDUCTIVE COATING MATERIAL, CONDUCTIVE SHEET, AND METHOD FOR PRODUCING COPPER POWDER

(71) Applicant: SUMITOMO METAL MINING CO., LTD., Tokyo (JP)

(72) Inventors: Hiroshi Okada, Niihama (JP); Yu Yamashita, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 168 days.

This patent is subject to a terminal disclaimer.

(21) Appl. No.: 15/572,941

(22) PCT Filed: Oct. 27, 2015

(86) PCT No.: PCT/JP2015/080263
§ 371 (c)(1),
(2) Date: Nov. 9, 2017

(87) PCT Pub. No.: WO2016/185629
PCT Pub. Date: Nov. 24, 2016

(65) Prior Publication Data
US 2018/0111190 A1    Apr. 26, 2018

(30) Foreign Application Priority Data
May 15, 2015   (JP) .................................. 2015-099808

(51) Int. Cl.
*B22F 1/00*    (2006.01)
*B22F 9/24*    (2006.01)
(Continued)

(52) U.S. Cl.
CPC .............. *B22F 1/0007* (2013.01); *B22F 1/00* (2013.01); *B22F 9/24* (2013.01); *C25C 5/02* (2013.01);
(Continued)

(58) Field of Classification Search
None
See application file for complete search history.

(56) References Cited

U.S. PATENT DOCUMENTS

| | | | |
|---|---|---|---|
| 4,469,564 | A | 9/1984 | Okinaka et al. |
| 4,652,465 | A | 3/1987 | Koto et al. |

(Continued)

FOREIGN PATENT DOCUMENTS

| | | | |
|---|---|---|---|
| CN | 1363000 | A | 8/2002 |
| CN | 1882550 | A | 12/2006 |

(Continued)

OTHER PUBLICATIONS

JPlat-Pat translation of JP2013-136818 (Year: 2019).*
(Continued)

*Primary Examiner* — Patricia L. Hailey
*Assistant Examiner* — Christopher Douglas Moody
(74) *Attorney, Agent, or Firm* — Locke Lord LLP; James E. Armstrong, IV; Nicholas J. DiCeglie, Jr.

(57) ABSTRACT

Provided is a copper powder which can be suitably utilized in applications such as an electrically conductive paste and an electromagnetic wave shield. A copper powder according to the present invention has a dendritic shape having a linearly grown main stem and a plurality of branches separated from the main stem, the main stem and the branches are constituted as flat plate-shaped copper particles having a cross-sectional average thickness of from 0.02 μm to 5.0 μm to be determined by scanning electron microscopic SEM observation gather, the average particle diameter D50 of the (Continued)

copper powder is from 1.0 μm to 100 μm, and the maximum height in the vertical direction with respect to the flat plate-shaped surface of the copper particles is 1/10 or less with respect to the maximum length in the horizontal direction of the flat plate-shaped surface of the copper particles.

20 Claims, 5 Drawing Sheets

(51) Int. Cl.
    *C25C 5/02*         (2006.01)
    *H01B 1/00*        (2006.01)
    *H01B 1/22*        (2006.01)
    *H01B 5/00*        (2006.01)

(52) U.S. Cl.
    CPC ............... *H01B 1/00* (2013.01); *H01B 1/22* (2013.01); *H01B 5/00* (2013.01); *B22F 2301/10* (2013.01); *B22F 2304/10* (2013.01); *B22F 2999/00* (2013.01); *Y02P 10/236* (2015.11)

(56) References Cited

U.S. PATENT DOCUMENTS

| | | | | |
|---|---|---|---|---|
| 4,891,068 A * | 1/1990 | Masumoto | ............ | B22F 1/0007 428/402 |
| 4,944,797 A | 7/1990 | Kemp, Jr. et al. | | |
| 5,013,346 A * | 5/1991 | Masumoto | ............ | B22F 1/0007 65/21.2 |
| 5,409,520 A * | 4/1995 | Mori | .................. | B22F 1/0007 420/469 |
| 5,945,158 A | 8/1999 | Djokic et al. | | |
| 6,036,839 A * | 3/2000 | Kohut | .................. | B22F 1/0007 205/280 |
| 6,322,609 B1 * | 11/2001 | Kohut | .................. | B22F 1/0007 205/574 |
| 6,395,332 B1 * | 5/2002 | Hanawa | ............... | B22F 1/0055 427/216 |
| 6,673,134 B2 * | 1/2004 | Hanawa | ............... | B22F 1/0055 241/15 |
| 7,618,475 B2 * | 11/2009 | Yamashina | ........... | B22F 1/0007 252/512 |
| 2002/0050186 A1 * | 5/2002 | Hanawa | ............... | B22F 1/0055 75/255 |
| 2002/0157957 A1 | 10/2002 | Saji et al. | | |
| 2003/0201427 A1 * | 10/2003 | Hori | .................... | B22F 1/0003 252/500 |
| 2006/0179975 A1 * | 8/2006 | Yamashina | ........... | B22F 1/0007 75/255 |
| 2006/0226398 A1 | 10/2006 | Hori et al. | | |
| 2007/0108062 A1 | 5/2007 | Brunner et al. | | |
| 2014/0102910 A1 | 4/2014 | Rohde et al. | | |
| 2014/0141238 A1 | 5/2014 | Yatsuka et al. | | |
| 2014/0346413 A1 | 11/2014 | Inoue et al. | | |
| 2015/0266090 A1 * | 9/2015 | Kamikoriyama | ........ | B22F 9/24 252/512 |
| 2017/0140847 A1 * | 5/2017 | Kamikoriyama | ........ | H05K 1/11 |
| 2017/0194073 A1 | 7/2017 | Takahashi et al. | | |
| 2017/0253750 A1 | 9/2017 | Okada et al. | | |
| 2018/0051176 A1 | 2/2018 | Okada et al. | | |
| 2018/0079000 A1 * | 3/2018 | Okada | ..................... | B22F 1/00 |
| 2018/0111190 A1 | 4/2018 | Okada et al. | | |
| 2018/0154436 A1 * | 6/2018 | Okada | ..................... | C09D 7/70 |

FOREIGN PATENT DOCUMENTS

| | | |
|---|---|---|
| CN | 103056356 A | 4/2013 |
| EP | 3162466 A1 | 5/2017 |
| EP | 3192597 A1 | 7/2017 |
| EP | 3275570 A1 | 1/2018 |
| JP | H06-240464 A | 8/1994 |
| JP | 09-003510 A | 1/1997 |
| JP | 2000-248303 A | 9/2000 |
| JP | 2002-015622 A | 1/2002 |
| JP | 2003-258490 A | 9/2003 |
| JP | 2005-200734 A | 7/2005 |
| JP | 2006-161081 A | 6/2006 |
| JP | 2011-058027 A | 3/2011 |
| JP | 4697643 B2 | 6/2011 |
| JP | 2011-214032 A | 10/2011 |
| JP | 2012-153967 A | 8/2012 |
| JP | 2013-019034 A | 1/2013 |
| JP | 2013-053347 A | 3/2013 |
| JP | 2013-089576 A | 5/2013 |
| JP | 2013-100592 A | 5/2013 |
| JP | 2013-136818 A | 7/2013 |
| JP | 2013-144829 A | 7/2013 |
| JP | 2013-168375 A | 8/2013 |
| JP | 2014-005531 A | 1/2014 |
| JP | 5503813 B1 | 5/2014 |
| JP | 2014-159646 A | 9/2014 |
| JP | 2015-105406 A | 6/2015 |
| JP | 5790900 B1 | 10/2015 |
| KR | 10-2013-0009592 A | 1/2013 |
| KR | 10-2013-0044132 A | 5/2013 |
| TW | 201313965 A | 4/2013 |
| TW | 201317311 A | 5/2013 |
| TW | 201413749 A | 4/2014 |
| WO | 2005/049584 A1 | 6/2005 |
| WO | 2013/132831 A1 | 12/2013 |
| WO | 2015/060258 A1 | 4/2015 |
| WO | 2015/115139 A1 | 8/2015 |

OTHER PUBLICATIONS

Notice of Reasons for Rejection dated Dec. 15, 2015, issued to JP Application No. 2015-099808.
International Search Report dated Dec. 15, 2015, issued for PCT/JP2015/080263.
G. Orhan et al. "Effect of electrolysis parameters on the morphologies of copper powder obtained in a rotating cylinder electrode cell", Powder Technology vol. 201 (2010) , pp. 57-63. (cited in the Nov. 20, 2018 Search Report issued for EP15892628.7 and in the Nov. 30, 2018 OA issued for CN201580079929.0).
Extended European Search Report dated Nov. 20, 2018, issued in the EP Patent Application No. EP15892628.7.
Office Action dated Nov. 30, 2018, issued in the CN Patent Application No. CN201580079929.0.
Office Action dated Mar. 19, 2019, issued in the KR Patent Application No. 10-2017-7032946.
Office Action issued in the TW Patent Application No. 104109957, dated Apr. 18, 2016.
International Search Report including Written Opinion issued to International Application No. PCT/JP2015/059482, dated Jun. 23, 2015.
Office Action issued in the CN Patent Application No. 2015800778523, dated Oct. 9, 2018.
Extended European Search Report issued in the EP Patent Application No. EP15886411.6, dated Oct. 24, 2018.
Office Action issued in the KR Patent Application No. KR10-2017-7030444, dated Jan. 9, 2019.
Office Action issued in the related U.S. Appl. No. 15/560,721, dated Jun. 19, 2019.
Office Action issued in the U.S. Appl. No. 15/572,907, dated Jun. 10, 2019.
Office Action issued in the KR Patent Application No. KR10-2017-7032925, dated Mar. 19, 2019.
Xiaoyun Zhu et al: "Electrochemical migration behavior of Ag-plated Cu-filled electrically conductive adhesives", Rare Metals—Xiyou Jinshu, vol. 31, No. 1, Jan. 26, 2012 (Jan. 26, 2012), pp. 64-70, XP055471122.
Xiaohei Liu et al: "Effect of Thixotropic Agent on the Properties of Conductive Silicone Rubber Gasket for EMI Shielding", Advanced Materials Research, vol. 239-242, May 1, 2011 (May 1, 2011), pp. 3350-3353, XP055471124.

(56) References Cited

OTHER PUBLICATIONS

Extended European Search Report issued in EP Patent Application No. 15840059.8, dated May 8, 2018.
Office Action issued to CN Patent Application No. 201580046403.2, dated Feb. 28, 2018.
International Search Report issued in International Application No. PCT/JP2015/059485 dated Jun. 23, 2015.
Office Action issued in KR Patent Application No. 10-2017-7004059, dated Dec. 12, 2017.
Office Action issued in U.S. Appl. No. 15/509,273, dated Dec. 14, 2017.
Notice of Reasons for Rejection issued in JP Patent Application No. 2015-099807, dated Dec. 15, 2015.
Office Action issued in TW Patent Application No. TW104135570, dated Sep. 2, 2016.
International Search Report issued in International Application No. PCT/JP20151080258 dated Dec. 15, 2015.
Office Action issued in the CN Patent Application No. CN201580079931.8, dated Nov. 30, 2018.
Extended European Search Report in the EP Patent Application No. EP15892627.9, dated Dec. 17, 2018.

* cited by examiner

COPPER POWDER, COPPER PASTE USING SAME, CONDUCTIVE COATING MATERIAL, CONDUCTIVE SHEET, AND METHOD FOR PRODUCING COPPER POWDER

CROSS REFERENCE TO RELATED APPLICATIONS

This application is related to co-pending application: "SILVER-COATED COPPER POWDER, COPPER PASTE USING SAME, CONDUCTIVE COATING MATERIAL, CONDUCTIVE SHEET, AND METHOD FOR PRODUCING SILVER-COATED COPPER POWDER" filed even date herewith in the name of Hiroshi OKADA as a national phase entry of PCT/JP2015/080258, which application is assigned to the assignee of the present application and is incorporated by reference herein.

TECHNICAL FIELD

The present invention relates to a copper powder, more specifically it relates to a copper powder which has a novel shape, is used as a material of an electrically conductive paste and the like, and can improve electrical conductivity, a copper paste, an electrically conductive coating material, and an electrically conductive sheet which use the copper powder, and a method for producing the copper powder.

BACKGROUND ART

A paste such as a resin type paste or a calcined type paste which uses a metal filler such as a silver powder or a copper powder are frequently used in the formation of a wiring layer, an electrode, and the like in an electronic device. An electrically conductive film to be a wiring layer, an electrode, or the like is formed by applying or printing a metal filler paste of silver or copper on various kinds of substrates of an electronic device and then subjecting the coated metal filler paste to heat curing or heat calcination.

For example, a resin type electrically conductive paste is composed of a metal filler, a resin, a curing agent, a solvent, and the like, and it is formed into an electrically conductive film by being printed on an electric conductor circuit pattern or a terminal and cured by heating at from 100° C. to 200° C. so as to form a wire or an electrode. In a resin type electrically conductive paste, the thermosetting resin is cured and shrunk by heat, and metal fillers are thus joined by pressure and brought into contact with one another to overlap each other, and as a result, an electrically connected current path is formed. This resin type electrically conductive paste is often used in a substrate using a material susceptible to heat such as a printed wiring board since this paste is treated at a curing temperature of 200° C. or lower.

On the other hand, a calcination type electrically conductive paste is composed of a metal filler, glass, a solvent, and the like, and it is formed into an electrically conductive film by being printed on an electric conductor circuit pattern or a terminal and calcined by heating at from 600° C. to 800° C. so as to form a wire or an electrode. The calcination type electrically conductive paste is treated at a high temperature so that the metal fillers are sintered together to secure the conduction property. This calcination type electrically conductive paste cannot be used in a printed wiring board using a resin material since it is treated at a high temperature for calcination in this manner, but it has an advantage that a low resistance is likely to be obtained since the metal fillers are connected with each other by sintering. Such a calcination type electrically conductive paste is used in, for example, an external electrode of a laminated ceramic capacitor.

Meanwhile, as a metal filler to be used in these resin type electrically conductive paste and calcination type electrically conductive paste, conventionally a silver powder has been often used. However, in recent years, use of a copper powder that is more inexpensive than a silver powder has been preferred because of a steep rise in prices of precious metals and for cost saving.

Here, as the powder of copper and the like to be used as a metal filler, powders having shapes such as a granular shape, a dendritic shape, and a flat plate shape have been often used since electrical conduction occurs as the particles are connected to each other as described above. Particularly, when the particles are evaluated by the size in three directions of length, width, and thickness, the particles having a flat plate shape having a thin thickness have an advantage that the particles can secure a larger contact area between the grains than cubic or spherical particles having a certain thickness and thus can achieve a low resistance, namely, a high electrical conductivity as well as the particles contribute to thinning of the wiring material by a decreased thickness. For this reason, the copper powder having a flat plate shape is particularly suitable for applications of an electrically conductive coating material and an electrically conductive paste which are desired to maintain the electrical conductivity. Incidentally, it is preferable to consider the influence of impurities contained in the copper powder in the case of thinly applying the electrically conductive paste for use.

In order to fabricate such a flat plate-shaped copper powder, for example, Patent Document 1 discloses a method for obtaining a flaky copper powder suitable for a metal filler of an electrically conductive paste. Specifically, a spherical copper powder having an average particle diameter of from 0.5 to 10 μm as a raw material is mechanically processed into a flat plate shape by mechanical energy of a medium filled in the mill by using a ball mill or a vibrating mill.

In addition, Patent Document 2 discloses a copper powder for an electrically conductive paste, specifically, a discoid copper powder capable of obtaining high performance as a copper paste for through holes and external electrodes and a technique relating to a production method thereof.

Specifically, a granular atomized copper powder is put into a medium stirring mill, a steel ball having a diameter of ⅛ to ¼ inch is used as a grinding medium, a fatty acid is added to the copper powder at from 0.5 to 1% by weight, and the granular atomized copper powder is ground in the air or an inert atmosphere to be processed into a flat plate shape.

Furthermore, Patent Document 3 discloses a method for obtaining an electrolytic copper powder which exhibits improved moldability as compared to a conventional electrolytic copper powder and can be molded to have a high strength without developing the dendrite of electrolytic copper powder more than the required extent. Specifically, in order to precipitate an electrolytic copper powder that can be molded to have a high strength by increasing the strength of the electrolytic copper powder itself, the electrolytic copper powder is precipitated by adding one kind or two or more kinds selected from a tungstate salt, a molybdate salt, and a sulfur-containing organic compound to an aqueous solution of copper sulfate of an electrolytic solution for the purpose of miniaturizing the size of the crystallites constituting the electrolytic copper powder.

In any of the methods disclosed in these Patent Documents, the granular copper powder obtained is formed into a flat plate shape by mechanical deformation (processing) using a medium such as a ball, and the size of the flat plate-shaped copper powder obtained by the processing is from 1 to 30 µm as an average particle diameter in the technique of Patent Document 1 and from 7 to 12 µm as an average particle diameter in the technique of Patent Document 3.

Meanwhile, an electrolytic copper powder precipitated in a dendritic shape called a dendritic shape is known, it has a large surface area and exhibits excellent moldability and sinterability as it has a dendritic shape, and it is used as a raw material of oil-retaining bearings and machine parts as a powder metallurgy application. Particularly, in oil-retaining bearings and the like, miniaturization has progressed, and porosity, thinning, and complicated shapes are required along with this.

In order to satisfy these requirements, for example, Patent Document 4 discloses a copper powder for metal powder injection molding having a complicated three-dimensional shape and a high dimensional accuracy and a method for manufacturing an injection molded article using the same. Specifically, it is indicated that the copper powder can be molded to have a high strength since the dendrites of the adjacent electrolytic copper powders are intertwined and firmly linked with one another at the time of compression molding by further developing the dendritic shape. Furthermore, it is described that the fact that the copper powder can have a greater number of contact points as compared to a spherical copper powder since the copper powder has a dendritic shape can be utilized in the case of utilizing the copper powder as a metal filler for an electrically conductive paste or electromagnetic wave shield.

However, in a case of utilizing the dendritic copper powder as a metal filler of an electrically conductive paste or an electromagnetic wave shield, when the metal filler in the resin has a dendritically developed shape, the dendritic copper powders are intertwined with one another to cause aggregation but do not uniformly dispersed in the resin, and viscosity of the paste increases by the aggregation, and this causes a problem in wiring formation by printing. Such a problem is also pointed out, for example, in Patent Document 3.

In this manner, it is not easy to use a dendritic copper powder as a metal filler of an electrically conductive paste and the like and the dendritic copper powder is also a cause of poor improvement in the electrical conductivity of the paste. Incidentally, in order to secure the electrical conductivity, a dendritic shape is more likely to secure the contact points than a granular shape and can secure higher electrical conductivity as an electrically conductive paste or an electromagnetic wave shield.

Patent Document 1: Japanese Unexamined Patent Application, Publication No. 2005-200734
Patent Document 2: Japanese Unexamined Patent Application, Publication No. 2002-15622
Patent Document 3: Japanese Unexamined Patent Application, Publication No. 2011-58027
Patent Document 4: Japanese Unexamined Patent Application, Publication No. H09-3510

DISCLOSURE OF THE INVENTION

Problems to be Solved by the Invention

The present invention has been proposed in view of such circumstances, and an object thereof is to provide a copper powder which can be suitably utilized in applications such as an electrically conductive paste and an electromagnetic wave shield while securing excellent electrical conductivity by increasing the number of contact points between the copper powders.

Means for Solving the Problems

The inventors of the present invention have conducted intensive investigations to solve the problems described above. As a result, it has been found out that a copper powder which has a dendritic shape having a main stem and a plurality of branches separated from the main stem and in which the main stem and the branches are constituted as flat plate-shaped copper particles having a specific cross-sectional average thickness gather, and the growth of the copper powder in the vertical direction with respect to the flat plate-shaped surface is suppressed forms a great number of contact points between the copper powders and exhibits excellent electrical conductivity, thereby completing the present invention. In other words, the present invention provides the following.

(1) A first aspect of the present invention is a copper powder having a dendritic shape having a linearly grown main stem and a plurality of branches separated from the main stem, in which the main stem and the branches are constituted as flat plate-shaped copper particles having a cross-sectional average thickness of from 0.02 µm to 5.0 µm to be determined by scanning electron microscopic (SEM) observation gather, an average particle diameter (D50) of the copper powder is from 1.0 µm to 100 µm, and a maximum height in a vertical direction with respect to a flat plate-shaped surface of the copper particles is 1/10 or less with respect to a maximum length in a horizontal direction of the flat plate-shaped surface.

(2) A second aspect of the present invention is the copper powder according to the first aspect, in which a bulk density of the copper powder is in a range of from 0.5 g/cm$^3$ to 5.0 g/cm$^3$.

(3) A third aspect of the present invention is the copper powder according to the first or second aspect, in which a BET specific surface area value of the copper powder is from 0.2 m$^2$/g to 5.0 m$^2$/g.

(4) A fourth aspect of the present invention is the copper powder according to any one of the first to third aspects, in which a crystallite diameter by the Miller indices of a (111) plane by X-ray diffraction is in a range of from 80 nm to 300 nm.

(5) A fifth aspect of the present invention is a metal filler containing the copper powder according to any one of the first to fourth aspects at a proportion of 20% by mass or more to the entire metal filler.

(6) A sixth aspect of the present invention is a copper paste containing the metal filler according to the fifth aspect mixed with a resin.

(7) A seventh aspect of the present invention is an electrically conductive coating material for electromagnetic wave shielding using the metal filler according to the fifth aspect.

(8) An eighth aspect of the present invention is an electrically conductive sheet for electromagnetic wave shielding using the metal filler according to the fifth aspect.

(9) A ninth aspect of the present invention is a method for producing the copper powder according to any one of the first to fourth aspects, in which electrolysis is conducted by using an electrolytic solution containing a copper ion, one or more kinds of compounds which have a phenazine structure and are represented by the following Formula (1), and one or more kinds of nonionic surfactants.

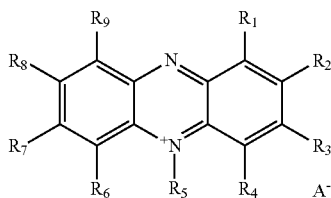

[Chem. 1]

(1)

[In Formula (1), $R_1$, $R_2$, $R_3$, $R_4$, $R_6$, $R_7$, $R_8$, and $R_9$ are each independently a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, and a C1 to C8 alkyl, $R_5$ is a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, a lower alkyl, and an aryl, and $A^-$ is a halide anion.]

(10) A tenth aspect of the present invention is a method for producing the copper powder according to any one of the first to fourth aspects, in which electrolysis is conducted by using an electrolytic solution containing a copper ion, one or more kinds of compounds which have an azobenzene structure and are represented by the following Formula (2), and one or more kinds of nonionic surfactants.

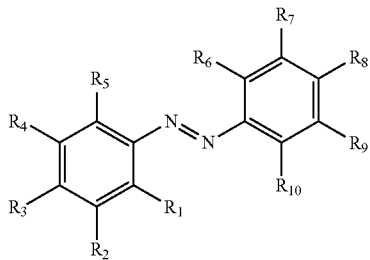

[Chem. 2]

(2)

[In Formula (2), $R_1$, $R_2$, $R_3$, $R_4$, $R_5$, $R_6$, $R_7$, $R_8$, $R_9$, and $R_{10}$ are each independently a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, a lower alkyl, and an aryl.]

(11) An eleventh aspect of the present invention is a method for producing the copper powder according to any one of the first to fourth aspects, in which electrolysis is conducted by using an electrolytic solution containing a copper ion, one or more kinds of compounds which have a phenazine structure and an azobenzene structure and are represented by the following Formula (3), and one or more kinds of nonionic surfactants.

[Chem. 3]

(3)

[In Formula (3), $R_1$, $R_2$, $R_4$, $R_5$, $R_6$, $R_7$, $R_8$, $R_9$, $R_{10}$, $R_{11}$, $R_{12}$, and $R_{13}$ are each independently a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, and a C1 to C8 alkyl, $R_3$ is a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, a lower alkyl, and an aryl, and $A^-$ is a halide anion.]

(12) A twelfth aspect of the present invention is a method for producing the copper powder according to any one of the first to fourth aspects, in which electrolysis is conducted by using an electrolytic solution containing a copper ion, two or more kinds selected from the group consisting of a compound which has a phenazine structure and is represented by the following Formula (1), a compound which has an azobenzene structure and is represented by the following Formula (2), and a compound which has a phenazine structure and an azobenzene structure and is represented by the following Formula (3), and one or more kinds of nonionic surfactants.

[Chem. 4]

(1)

[In Formula (1), $R_1$, $R_2$, $R_3$, $R_4$, $R_6$, $R_7$, $R_8$, and $R_9$ are each independently a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, and a C1 to C8 alkyl, $R_5$ is a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, a lower alkyl, and an aryl, and $A^-$ is a halide anion.]

[Chem. 5]

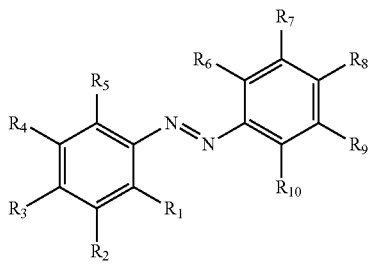

(2)

[In Formula (2), $R_1$, $R_2$, $R_3$, $R_4$, $R_5$, $R_6$, $R_7$, $R_8$, $R_9$, and $R_{10}$ are each independently a group selected from the group consisting of hydrogen, a halogen, amino, OH, =O, CN, SCN, SH, COOH, a COO salt, a COO ester, $SO_3H$, a $SO_2$ salt, a $SO_2$ ester, benzenesulfonic acid, a lower alkyl, and an aryl.]

[Chem. 6]

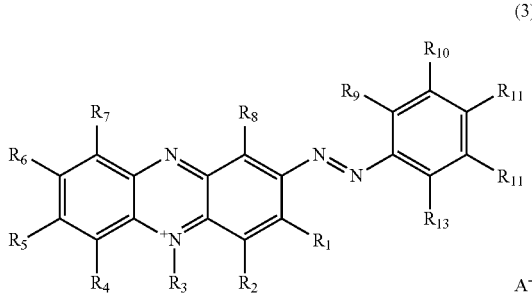

(3)

[In Formula (3), $R_1$, $R_2$, $R_4$, $R_5$, $R_6$, $R_7$, $R_8$, $R_9$, $R_{10}$, $R_{11}$, $R_{12}$, and $R_{13}$ are each independently a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, and a C1 to C8 alkyl, $R_3$ is a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, a lower alkyl, and an aryl, and $A^-$ is a halide anion.]

Effects of the Invention

According to the copper powder of the present invention, it is possible to secure a great number of contact points and to increase the contact area, and it is possible to suitably utilize the silver-coated copper powder in applications such as an electrically conductive paste and an electromagnetic wave shield by securing excellent electrical conductivity and prevent the aggregation thereof.

PREFERRED MODE FOR CARRYING OUT THE INVENTION

Hereinafter, specific embodiments (hereinafter referred to as the "present embodiment") of copper powder according to the present invention will be described in detail with reference to the drawings. Incidentally, the present invention is not limited to the following embodiments, and various modifications are possible without changing the gist of the present invention. In addition, in the present specification, the notation "X to Y" (X and Y are arbitrary numerical values) means "X or more and Y or less".

<<1. Shape of Dendritic Copper Powder>>

The copper powder according to the present embodiment is a dendrite-shaped copper powder having a dendritic shape having a linearly grown main stem and a plurality of branches separated from the main stem (hereinafter, the copper powder according to the present embodiment is also referred to as a "dendritic copper powder") when observed through a scanning electron microscope (SEM). The main stem and the branches are constituted as flat plate-shaped copper particles having a cross-sectional average thickness of from 0.02 μm to 5.0 μm to be determined by scanning electron microscopic (SEM) observation gather, and the average particle diameter (D50) of the copper powder is from 1.0 μm to 100 μm. Moreover, in this dendritic copper powder, the height in the vertical direction with respect to the flat plate-shaped surface of the flat plate-shaped copper particles is 1/10 or less with respect to the maximum length in the horizontal direction, the growth of this dendritic copper powder in the vertical direction is suppressed, and this dendritic copper powder thus has a smooth surface.

Incidentally, the dendritic copper powder according to the present embodiment can be obtained, for example, by being precipitated on the cathode by immersing an anode and a cathode in an electrolytic solution which exhibits acidity by sulfuric acid and contains a copper ion and applying a direct current to the electrolytic solution for electrolysis although the details will be described later.

Figure 1:
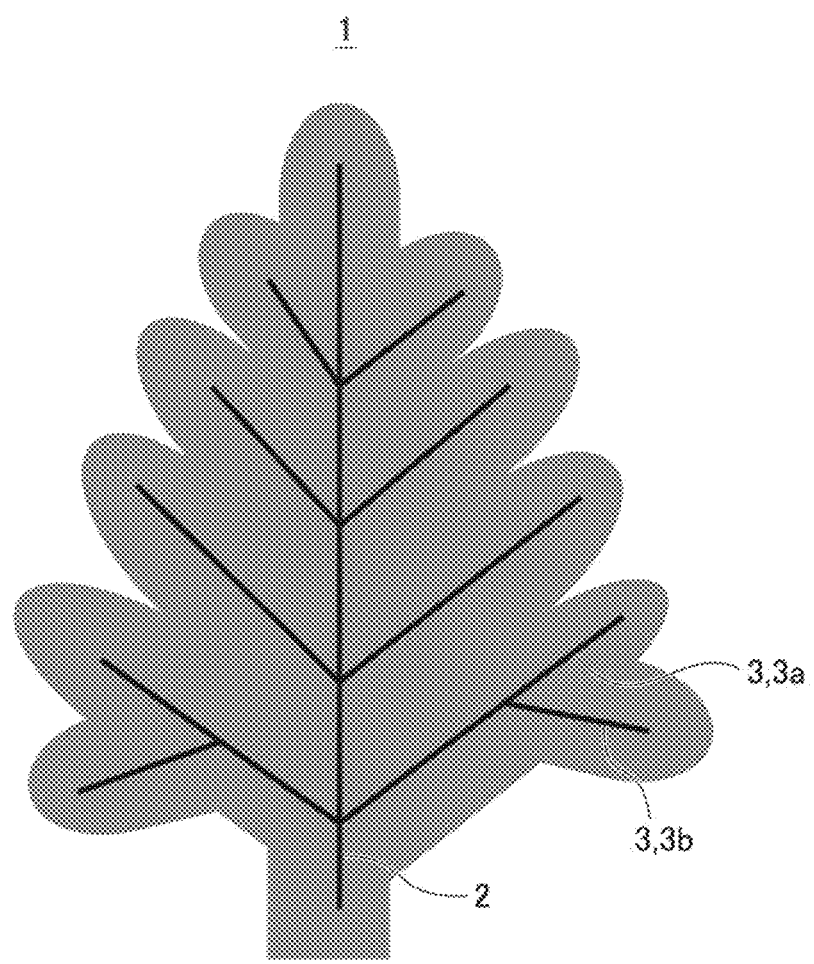
FIG. 1 is a diagram which schematically illustrates a specific shape of a dendritic copper powder.
Figure 2:
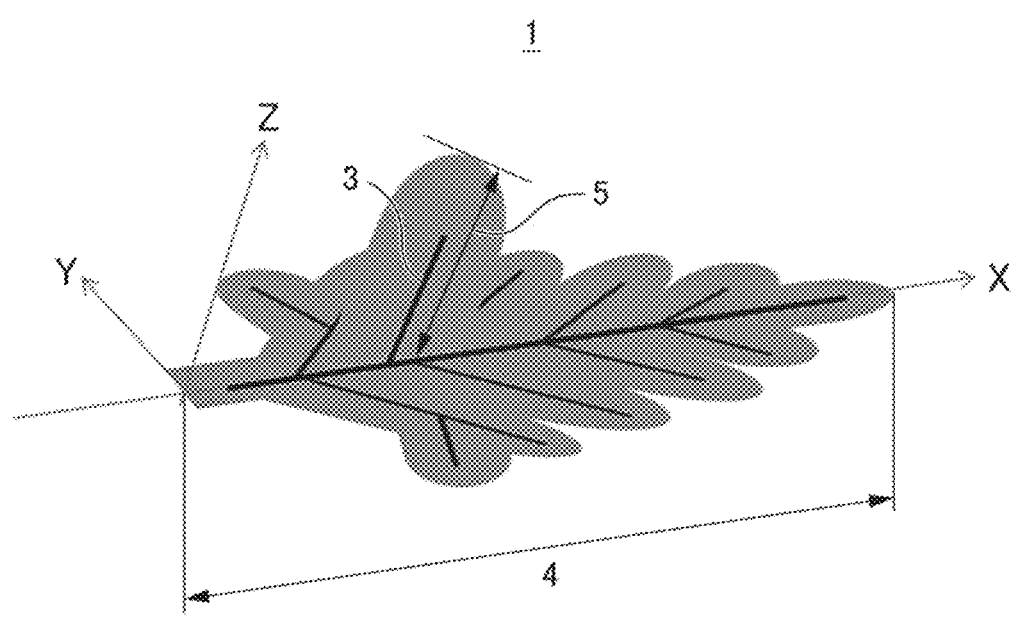
FIG. 2 is a diagram which schematically illustrates a specific shape of a dendritic copper powder.

FIGS. 1 and 2 are diagrams which schematically illustrate the specific shape of the dendritic copper powder according to the present embodiment. As illustrated in FIG. 1, this dendritic copper powder 1 has a dendritic shape having a main stem 2 which has linearly grown and a plurality of branches 3 which are separated from the main stem 2. Incidentally, the branches 3 in the dendritic copper powder 1 mean not only the branches 3a and 3b which have branched from the main stem 2 but also branches which have further branched from the branches 3a and 3b.

Moreover, the main stem 2 and the branches 3 are constituted as flat plate-shaped copper particles having a cross-sectional average thickness of from 0.02 μm to 5.0 μm to be determined by SEM observation gather as described above. It is considered that such flat plate-shaped copper particles are formed since the growth of the copper particles is suppressed as specific additives added to the electrolytic solution adsorb to the surface of the copper particles when electrolytic deposition of copper powder is performed and, as a result, the copper particles grow in a flat plate shape as to be described later.

Figure 3:
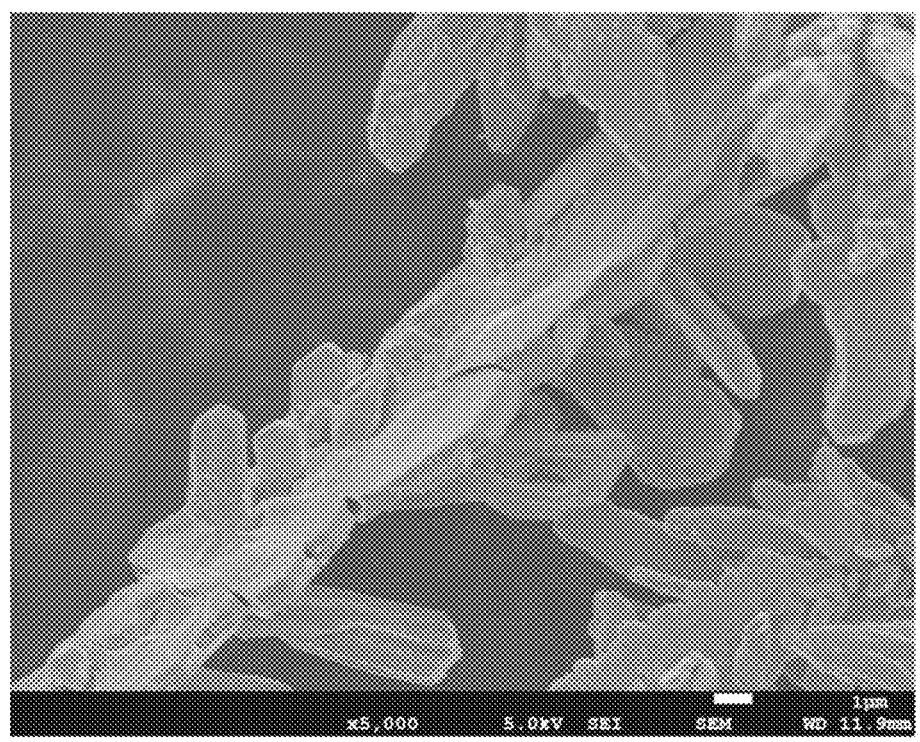
FIG. 3 is a photograph which illustrates an observation image when a conventional dendritic copper powder is observed through a scanning electron microscope (SEM) at 5,000-times magnification.

However, when the growth of copper powder also occurs, for example, in the vertical direction (Z direction in FIG. 2) with respect to the flat plate-shaped surface illustrated in FIG. 2, the copper particles themselves of the branches which have respectively grown have a flat plate shape but a copper powder in which the copper particles have also grown in the vertical direction like protrusions is formed. Here, FIG. 3 is a photograph which illustrates an example of the observation images when such a copper powder that has also grown in the vertical direction with respect to the flat plate-shaped surface is observed through a SEM (5,000-times magnification). In the copper powder illustrated in this photograph, the copper particles grow in the vertical direction with respect to the flat plate-shaped surface to form protrusions and a part of the flat plate-shaped surface is bent to have a shape having a height in the vertical direction.

When copper particles grow in the vertical direction as illustrated in the photograph of FIG. 3, a problem arises that the copper powder grows bulky due to the growth of the copper particles in the vertical direction so that the filling density is not achieved and the electrical conductivity cannot be sufficiently secured, for example, in the case of utilizing the copper powder in applications such as an electrically conductive paste and an electrically conductive coating material.

On the contrary, the dendritic copper powder 1 according to the present embodiment is a copper powder having a substantially smooth surface by suppressing the growth thereof in the vertical direction with respect to the flat plate-shaped surface. Specifically, in this dendritic copper powder 1, the maximum height (the symbol "5" in FIG. 2) in the vertical direction with respect to the flat plate-shaped surface is $\frac{1}{10}$ or less with respect to the maximum length (the symbol "4" in FIG. 2) to be the long length in the horizontal direction of the flat plate-shaped surface. Incidentally, the maximum height 5 in the vertical direction with respect to the flat plate-shaped surface is not the thickness of the flat plate-shaped surface but is the height of the protrusion, for example, in a case in which a protrusion is formed on the flat plate-shaped surface, and the thickness direction based on the flat plate-shaped "surface" means the "height" in the opposite direction. In addition, the maximum length 4 in the horizontal direction with respect to the flat plate-shaped surface means the length of major axis of the flat plate-shaped surface.

Figure 4:
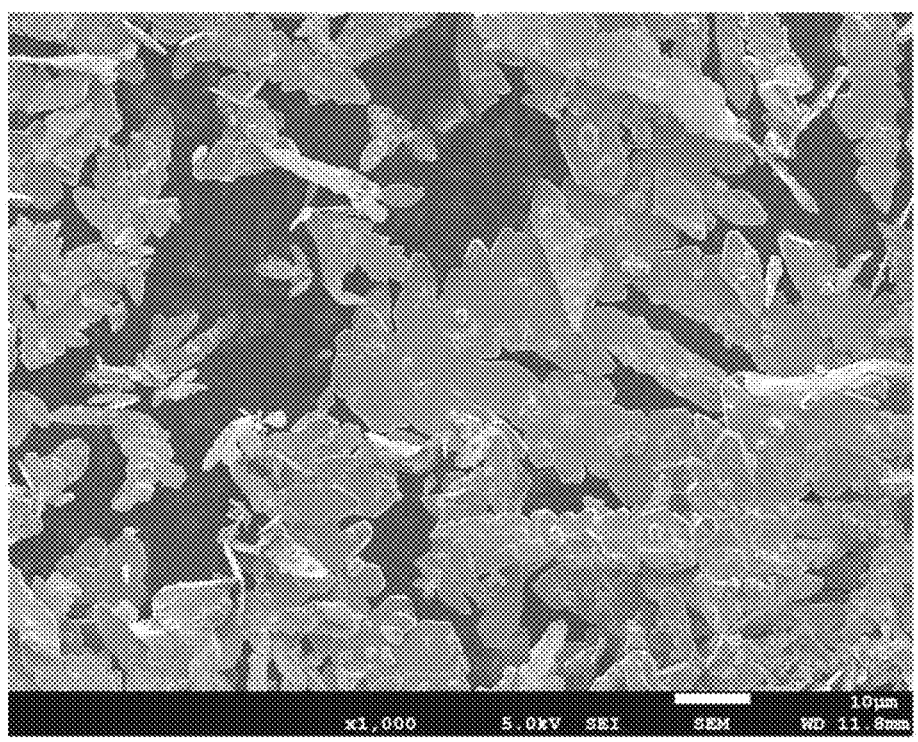
FIG. 4 is a photograph which illustrates an observation image when a dendritic copper powder is observed through a scanning electron microscope (SEM) at 1,000-times magnification.
Figure 5:
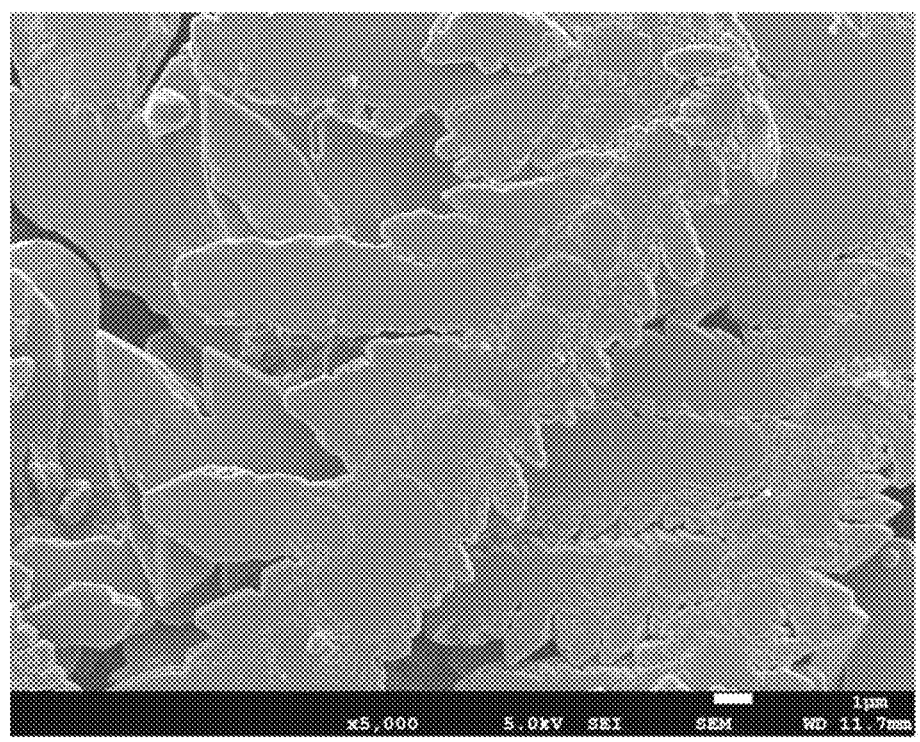
FIG. 5 is a photograph which illustrates an observation image when a dendritic copper powder is observed through a scanning electron microscope (SEM) at 5,000-times magnification.

Here, FIGS. 4 and 5 are photographs which illustrate an example of the observation images when the dendritic copper powder 1 according to the present embodiment is observed through a SEM, namely, the observation images of a flat plate-shaped dendritic copper powder of which the growth in the vertical direction with respect to the flat plate-shaped surface is suppressed. Incidentally, FIG. 4 illustrates an image observed at 1,000-times magnification and FIG. 5 illustrates an image observed at 5,000-times magnification. As illustrated in these photographs, it is understood that the dendritic copper powder is a dendritic and flat plate-shaped copper powder of which the growth in the vertical direction with respect to the flat plate-shaped surface is suppressed and which thus has a substantially smooth surface.

By being such a flat plate-shaped copper powder of which the growth in the vertical direction is suppressed, it is possible to secure a large contact area between the dendritic copper powders. Moreover, it is possible to realize a low resistance, namely, a high electrical conductivity as the contact area increases. This makes it possible to further improve the electrical conductivity and to favorably maintain the electrical conductivity, and the copper powder can be suitably used in applications such as an electrically conductive coating material and an electrically conductive paste. In addition, the dendritic copper powder 1 can contribute to thinning of the wiring material and the like as it is constituted as flat plate-shaped copper particles gather.

In addition, the average particle diameter (D50) of the dendritic copper powder 1 according to the present embodiment is from 1.0 µm to 100 µm. The average particle diameter can be controlled by changing the conditions for electrolysis to be described later. In addition, it is possible to further adjust the average particle diameter to a desired size by conducting mechanical grinding or crushing by a jet mill, a sample mill, a cyclone mill, a bead mill, or the like if necessary. Incidentally, the average particle diameter (D50) can be measured by, for example, a laser diffraction/scattering type particle size distribution measuring method.

Here, for example, as pointed out in Patent Document 1 as well, examples of the problem of a dendritic copper powder may include the fact that the dendritic copper powders are intertwined with one another to cause aggregation but do not uniformly dispersed in the resin when the metal filler in the resin has a dendritically developed shape in the case of utilizing the dendritic copper powder as a metal filler of an electrically conductive paste, a resin for electromagnetic wave shielding, and the like. In addition, the viscosity of the paste increases by the aggregation, and this causes a problem in wiring formation by printing. This is because the dendritic copper powder radially grows in a needle shape so that the dendritic copper powders are intertwined with one another and aggregate into a large lump.

In this regard, it is possible to prevent the aggregation of the copper powders due to entanglement therebetween as the dendritic copper powder 1 according to the present embodiment is constituted as flat plate-shaped copper particles having a cross-sectional average thickness of from 0.02 µm to 5.0 µm gather. In other words, as the dendritic copper powder is formed as flat plate-shaped copper particles grow, the copper powders come into contact with each other on the plane and it is possible to prevent the aggregation of the copper powders due to entanglement therebetween and to uniformly disperse the copper powders in the resin. In addition, by bringing the copper powders into contact with each other on the plane by growing the copper particles into a flat plate shape in this manner, it is possible to suppress the contact resistance by contact in a large area to a low level.

In particular, the dendritic copper powder 1 according to the present embodiment is constituted by flat plate-shaped copper particles and also the growth of the copper particles in the vertical direction with respect to the flat plate-shaped surface is suppressed as illustrated in the schematic diagram of FIG. 2 and the photographs of FIGS. 4 and 5. According to such a dendritic copper powder 1, it is possible to secure a larger contact area between the copper powders, to more effectively prevent the aggregation of the copper powder, and to uniformly disperse the dendritic copper powder in the resin.

In addition, as described in Patent Document 1 and Patent Document 2, for example, in the case of forming a spherical copper powder into a flat plate shape by a mechanical method, it is required to prevent the oxidation of copper at the time of mechanical processing, and the spherical copper powder is thus processed into a flat plate shape by adding a fatty acid to the spherical copper powder and grinding the spherical copper powder in the air or an inert atmosphere. However, there are cases in which it is impossible to completely prevent the oxidation and the fatty acid added at the time of processing affects the dispersibility when forming a paste, and it is thus required to remove the fatty acid after the processing is completed, but the fatty acid is firmly attached to the copper surface by the pressure at the time of mechanical processing in some cases, and a problem arises that the fatty acid cannot be completely removed. Moreover, when an oxide film or fatty acid which inhibits electrical conductivity is present on the surface of the metal filler in the case of utilizing the copper powder as a metal filler of an electrically conductive paste, a resin for electromagnetic wave shielding, and the like, the electrical resistance increases and the properties of the metal filler cannot be sufficiently exerted.

In this regard, the dendritic copper powder 1 according to the present embodiment can be formed into a flat plate shape by directly growing the copper powder through electrolysis without conducting mechanical processing, and thus the problem of oxidation and the problem due to the residual fatty acid which have so far been a problem in the mechanical method do not arise, a copper powder having a surface in a favorable state is obtained, the copper powder can be in an extremely favorable state in terms of electrical conductivity, and a low resistance can be realized in the case of utilizing the copper powder as a metal filler of an electrically conductive paste, a resin for electromagnetic wave shielding, and the like. Incidentally, the method for producing this dendritic copper powder 1 will be described later in detail.

In addition, the filling factor of the metal filler is important in order to realize a lower resistance. In order to further increase the filling factor, smoothness of the flat plate-shaped dendritic copper powder is required. In other words, the smoothness is high, the filling factor increases, the number of contact points on the face of the copper powders increases, and a lower resistance can be thus realized as the form of the dendritic copper powder 1 according to the present embodiment is that the maximum height in the vertical direction with respect to the flat plate-shaped surface is 1/10 or less with respect to the maximum length in the horizontal direction with respect to the flat plate-shaped surface.

In addition, the bulk density of the dendritic copper powder 1 is not particularly limited, but it is preferably in a range of from 0.5 g/cm$^3$ to 5.0 g/cm$^3$. When the bulk density is less than 0.5 g/cm$^3$, there is a possibility that the contact points between the copper powders cannot be sufficiently secured. On the other hand, when the bulk density exceeds 5.0 g/cm$^3$, the average particle diameter of the dendritic copper powder also increases so that the surface area decreases and the moldability and sinterability deteriorate in some cases.

In addition, the BET specific surface area value of the dendritic copper powder 1 is not particularly limited, but it is preferably from 0.2 m$^2$/g to 5.0 m$^2$/g. When the BET specific surface area value is less than 0.2 m$^2$/g, the copper particles constituting the dendritic copper powder 1 do not have a desired flat plate shape as described above and high electrical conductivity is not obtained in some cases. On the other hand, when the BET specific surface area value exceeds 5.0 m$^2$/g, the aggregation of the copper powder is likely to occur and it is difficult to uniformly disperse the copper powder in the resin when forming a paste. Incidentally, the BET specific surface area can be measured in conformity with JIS Z 8830: 2013.

In addition, the crystallite diameter of the dendritic copper powder 1 is not particularly limited, but it preferably falls in a range of from 80 nm to 300 nm. When the crystallite diameter is less than 80 nm, the copper particles constituting the main stem and the branches tend to have a shape close to a spherical shape rather than a flat plate shape, it is difficult to secure a sufficiently large contact area, and there is a possibility that the electrical conductivity decreases. On the other hand, when the crystallite diameter exceeds 300 nm, moldability and sinterability deteriorate in some cases.

Incidentally, the crystallite diameter here is determined from the diffraction pattern obtained by using an X-ray diffraction measuring apparatus based on the Scherrer equation to be expressed by the following mathematical formula, and it is the crystallite diameter by the Miller indices of the (111) plane by X-ray diffraction. $D=0.9\lambda/\beta \cos \theta$ (D: crystallite diameter (nm), $\beta$: spread of diffraction peak due to size of crystallite (rad), $\lambda$: wavelength of X-ray [CuK$\alpha$] (nm), $\theta$: diffraction angle (°).)

Incidentally, it is possible to obtain the same effect as a copper powder composed only of the dendritic copper powder 1 although copper powders having shapes other than the shape described above are mixed in the copper powders obtained as long as the dendritic copper powder 1 having a shape as described above accounts for a predetermined proportion in the copper powders obtained when observed through an electron microscope. Specifically, copper powders having shapes other than the shape described above may be contained in the copper powders obtained as long as the dendritic copper powder 1 having the shape described above accounts for a proportion of 80% by number or more and preferably 90% by number or more in the entire copper powders when observed through an electron microscope (for example, 500-times to 20,000-times).

<<2. Production Method of Dendritic Copper Powder>>

The dendritic copper powder according to the present embodiment can be produced by a predetermined electrolytic method using, for example, a solution which exhibits acidity by sulfuric acid and contains a copper ion as an electrolytic solution.

Upon electrolysis, for example, the electrolytic solution which exhibits acidity by sulfuric acid and contains a copper ion described above is accommodated in an electrolytic cell in which metallic copper is installed as the anode and a stainless steel plate, a titanium plate, or the like is installed as the cathode and an electrolytic treatment is conducted by applying a direct current to the electrolytic solution at a predetermined current density. This makes it possible to precipitate (electrodeposit) a fine dendritic copper powder on the cathode along with electric current application. Particularly, in the present embodiment, it is possible to precipitate a flat plate-shaped dendritic copper powder constituted as flat plate-shaped copper particles gather by adding a specific additive, a nonionic surfactant, and a chloride ion to the electrolytic solution which exhibits acidity by sulfuric acid and contains a water soluble copper salt to be a copper ion source.

(1) Copper Ion

The water-soluble copper salt is a copper ion source for supplying a copper ion, and examples thereof may include copper sulfate such as copper sulfate pentahydrate, and copper nitrate, but the water-soluble copper salt is not limited thereto. In addition, copper oxide may be dissolved in a sulfuric acid solution to form a solution exhibiting acidity by sulfuric acid. The concentration of the copper ion in the electrolytic solution can be set to about from 1 g/L to 20 g/L and preferably about from 5 g/L to 10 g/L.

(2) Sulfuric Acid

Sulfuric acid is one for preparing an electrolytic solution exhibiting acidity by sulfuric acid. The concentration of sulfuric acid in the electrolytic solution can be set to about from 20 g/L to 300 g/L and preferably about from 50 g/L to 150 g/L as the concentration of free sulfuric acid. This concentration of sulfuric acid affects the electrical conductivity of the electrolytic solution and it thus affects the uniformity of the copper powder to be obtained on the cathode.

(3) Additive

As an additive, any one or more kinds of compounds selected from the group consisting of a compound having a phenazine structure, a compound having an azobenzene structure, and a compound having a phenazine structure and an azobenzene structure or two or more kinds of compounds which have different molecular structures and are selected from the group described above are used concurrently. In the present embodiment, it is possible to produce a copper powder of which the growth in the vertical direction with respect to the flat plate-shaped surface is suppressed, namely, a copper powder having a smooth surface by adding such an additive to the electrolytic solution together with a nonionic surfactant to be described later.

The concentration of the additive selected from the group consisting of a compound having a phenazine structure, a compound having an azobenzene structure, and a compound having a phenazine structure and an azobenzene structure in the electrolytic solution is preferably about from 1 to 1000 mg/L in total of the compounds to be added.

(Compound Having Phenazine Structure)

A compound having a phenazine structure can be represented by the following Formula (1). In the present embodiment, one kind or two or more kinds of compounds which have a phenazine structure and are represented by the following Formula (1) can be contained as an additive.

[Chem. 7]

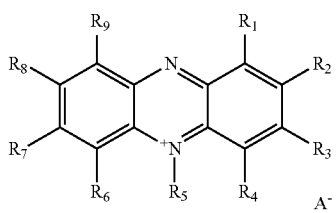

(1)

Here, in Formula (1), $R_1$, $R_2$, $R_3$, $R_4$, $R_6$, $R_7$, $R_8$, and $R_9$ are each independently a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, and a C1 to C8 alkyl. In addition, $R_5$ is a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, a lower alkyl, and an aryl. In addition, $A^-$ is a halide anion.

Specific examples of the compound having a phenazine structure may include 5-methylphenazin-5-ium, aeruginosin B, aeruginosin A, 5-ethylphenazin-5-ium, 3,7-diamino-5-phenylphenazin-5-ium, 5-ethylphenazin-5-ium, 5-methylphenazin-5-ium, 3-amino-5-phenyl-7-(diethylamino) phenazin-5-ium, 2,8-dimethyl-3,7-diamino-5-phenylphenazin-5-ium, 1-methoxy-5-methylphenazin-5-ium, 3-amino-7-(dimethylamino)-1,2-dimethyl-5-(3-sulfonatophenyl)phenazin-5-ium, 1,3-diamino-5-methylphenazin-5-ium, 1,3-diamino-5-phenylphenazin-5-ium, 3-amino-7-(diethylamino)-2-methyl-5-phenylphenazin-5-ium, 3,7-bis(diethylamino)-5-phenylphenazin-5-ium, 2,8-dimethyl-3,7-diamino-5-(4-methylphenyl)phenazin-5-ium, 3-(methylamino)-5-methylphenazin-5-ium, 3-hydroxy-7-(diethylamino)-5-phenylphenazin-5-ium, 5-azoniaphenazine, 1-hydroxy-5-methylphenazin-5-ium, 4H,6H-5-phenyl-3,7-dioxophenazin-5-ium, Anilinoaposafranin, Phenosafranine, and Neutral Red.

(Compound Having Azobenzene Structure)

A compound having an azobenzene structure can be represented by the following Formula (2). In the present embodiment, one kind or two or more kinds of compounds which have an azobenzene structure and are represented by the following Formula (2) can be contained as an additive.

[Chem. 8]

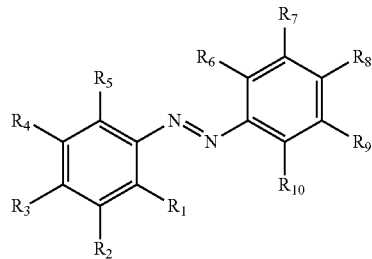

(2)

Here, in Formula (2), $R_1$, $R_2$, $R_3$, $R_4$, $R_5$, $R_6$, $R_7$, $R_8$, $R_9$, and $R_{10}$ are each independently a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, a lower alkyl, and an aryl.

Specific examples of the compound having an azobenzene structure may include azobenzene, 4-aminoazobenzene-4'-sulfonic acid, 4-(dimethylamino)-4'-(trifluoromethyl) azobenzene, C.I. Acid Red 13, Mercury Orange, 2',4'-diamino-5'-methylazobenzene-4-sodium sulfonate, methyl red, methyl yellow, methyl orange, azobenzene-2,4-diamine, alizarin yellow GG, 4-dimethylaminoazobenzene, Orange I, salazosulfapyridin, 4-(diethylamino)azobenzene, Orange OT, 3-methoxy-4-aminoazobenzene, 4-aminoazobenzene, N,N,-2-trimethylazobenzene-4-amine, 4-hydroxyazobenzene, Sudan I, 4-amino-3,5-dimethylazobenzene, N,N-dimethyl-4-[(quinolin-6-yl)azo]benzenamine, o-aminoazotoluene, alizarin yellow R, 4'-(aminosulfonyl)-4-hydroxyazobenzene-3-carboxylic acid, Congo red, Vital Red, Metanil Yellow, Orange II, Disperse Orange 3, C.I. Direct Orange 39, 2,2'-dihydroxyazobenzene, azobenzene-4,4'-diol, naphthyl red, 5-phenylazobenzene-2-ol, 2,2'-dimethylazobenzene, C.I. Mordant Yellow 12, Mordant Yellow 10, Acid Yellow, Disperse Blue, New Yellow RMF, and Bistramine Brown G.

(Compound Having Phenazine Structure and Azobenzene Structure)

A compound having a phenazine structure and an azobenzene structure can be represented by the following Formula (3). In the present embodiment, one kind or two or more kinds of compounds which have a phenazine structure and an azobenzene structure and are represented by the following Formula (3) can be contained as an additive.

[Chem. 9]

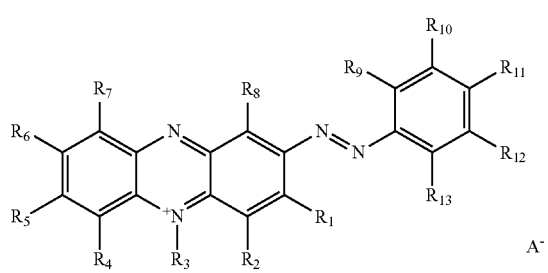

(3)

Here, in Formula (3), $R_1$, $R_2$, $R_4$, $R_5$, $R_6$, $R_7$, $R_8$, $R_9$, $R_{10}$, $R_{11}$, $R_{12}$, and $R_{13}$ are each independently a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, and a C1 to C8 alkyl. In addition, $R_3$ is a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, a lower alkyl, and an aryl. In addition, $A^-$ is a halide anion.

Specific examples of the compound having a phenazine structure and an azobenzene structure may include 3-(diethylamino)-7-[(4-hydroxyphenyl)azo]-2,8-dimethyl-5-phenylphenazin-5-ium, 3-[[4-(dimethylamino)phenyl]azo]-7-(diethylamino)-5-phenylphenazin-5-ium, Janus Green B, 3-amino-7-[(2,4-diaminophenyl)azo]-2,8-dimethyl-5-phenylphenazin-5-ium, 2,8-dimethyl-3-amino-5-phenyl-7-(2-hydroxy-1-naphthylazo)phenazin-5-ium, 3-[[4-(dimethylamino)phenyl]azo]-7-(dimethylamino)-5-phenylphenazin-5-ium, 3-amino-7-[[4-(dimethylamino)phenyl]azo]-5-phenylphenazin-5-ium, 2-(diethylamino)-7-[4-(methylpropargylamino)phenylazo]-9-phenyl-9-azonia-10-azaanthracene, 2-(diethylamino)-7-[4-(methyl 4-pentynylamino)phenylazo]-9-phenyl-9-azonia-10-azaanthracene, and 2-(diethylamino)-7-[4-(methyl 2,3-dihydroxypropylamino)phenylazo]-9-phenyl-9-azonia-10-azaanthracene.

(4) Surfactant

As a surfactant, a nonionic surfactant is contained. In the present embodiment, it is possible to produce a copper powder of which the growth in the vertical direction with respect to the flat plate-shaped surface is suppressed, namely, a copper powder having a smooth surface by adding a nonionic surfactant to the electrolytic solution together with the additives described above.

As the nonionic surfactant, one kind can be used singly or two or more kinds can be used concurrently, and the concentration of the nonionic surfactant in the electrolytic solution can be set to about from 1 to 10000 mg/L in total.

The number average molecular weight of the nonionic surfactant is not particularly limited, but it is preferably from 100 to 200000, more preferably from 200 to 15000, and still more preferably from 1000 to 10000. There is a possibility that a fine electrolytic copper powder which does not have a dendritic shape is precipitated when the surfactant has a number average molecular weight of less than 100. On the other hand, there is the possibility that an electrolytic copper powder having a large average particle diameter is precipitated and only dendritic copper powders having a specific surface area of less than 0.2 $m^2$/g are obtained when the surfactant has a number average molecular weight of more than 200,000. Incidentally, in the present embodiment, the number average molecular weight is defined as the molecular weight in terms of polystyrene determined by gel permeation chromatography (GPC) using tetrahydrofuran (THF) as a solvent.

The kind of the nonionic surfactant is not particularly limited, but it is preferably a surfactant having an ether group, and examples thereof may include polyethylene glycol, polypropylene glycol, polyethyleneimine, a Pluronic type surfactant, a Tetronic type surfactant, polyoxyethylene glycol.glycerin ether, polyoxyethylene glycol.dialkyl ether, polyoxyethylene polyoxypropylene glycol.alkyl ether, an aromatic alcohol alkoxylate, and a polymer compound represented by the following Formula (x), and these nonionic surfactants can be used singly or two or more kinds thereof can be used concurrently.

More specifically, for example, those represented by the following Formula (i) can be used as polyethylene glycol.

[Chem. 10]

(i)

(In Formula (i), n1 represents an integer from 1 to 120.)

In addition, for example, those represented by the following Formula (ii) can be used as polypropylene glycol.

[Chem. 11]

(ii)

(In Formula (ii), n1 represents an integer from 1 to 90.)

In addition, for example, those represented by the following Formula (iii) can be used as polyethyleneimine.

[Chem. 12]

(iii)

(In Formula (iii), n1 represents an integer from 1 to 120.)

In addition, for example, those represented by the following Formula (iv) can be used as the Pluronic type surfactant.

[Chem. 13]

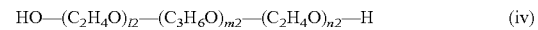

(iv)

(In Formula (iv), n2 and l2 represent an integer from 1 to 30 and m2 represents an integer from 10 to 100.)

In addition, for example, those represented by the following Formula (v) can be used as the Tetronic type surfactant.

[Chem. 14]

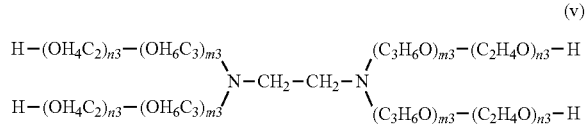

(v)

(In Formula (v), n3 represents an integer from 1 to 200 and m3 represents an integer from 1 to 40.)

In addition, for example, those represented by the following Formula (vi) can be used as polyoxyethylene glycol.glyceryl ether.

[Chem. 15]

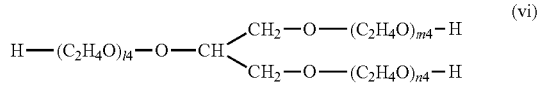

(vi)

(In Formula (vi), n4, m4, and l4 each represent an integer from 1 to 200.)

In addition, for example, those represented by the following Formula (vii) can be used as polyoxyethylene glycol.dialkyl ether.

[Chem. 16]

(vii)

(In Formula (vii), R1 and R2 represent a hydrogen atom or a lower alkyl group having from 1 to 5 carbon atoms and n5 represents an integer from 2 to 200.)

In addition, for example, those represented by the following Formula (viii) can be used as polyoxyethylene polyoxypropylene glycol.alkyl ether.

[Chem. 17]

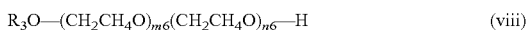

(viii)

(In Formula (viii), R3 represents a hydrogen atom or a lower alkyl group having from 1 to 5 carbon atoms and m6 or n6 represents an integer from 2 to 100.)

In addition, for example, those represented by the following Formula (ix) can be used as the aromatic alcohol alkoxylated.

[Chem. 18]

(ix)

(In Formula (ix), m7 represents an integer from 1 to 5 and n7 represents an integer from 1 to 120.)

In addition, a polymer compound represented by the following Formula (x) can be used.

[Chem. 19]

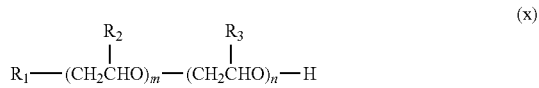

(x)

(In Formula (x), $R_1$ represents a residue of a higher alcohol having from 5 to 30 carbon atoms, a residue of an alkylphenol having an alkyl group having from 1 to 30 carbon atoms, a residue of an alkylnaphthol having an alkyl group having from 1 to 30 carbon atoms, a residue of a fatty acid amide having from 3 to 25 carbon atoms, a residue of an alkyl amine having from 2 to 5 carbon atoms, or a hydroxyl group. In addition, $R_2$ and $R_3$ represent a hydrogen atom or a methyl group. In addition, m and n represent an integer from 1 to 100.)

(5) Chloride Ion

The chloride ion can be contained in the electrolytic solution by adding a compound (chloride ion source) for supplying a chloride ion such as hydrochloric acid and sodium chloride to the electrolytic solution. The chloride ion contributes to the shape control of the copper powder to be precipitated together with the additive and nonionic surfactant described above. The concentration of chloride ion in the electrolytic solution is not particularly limited, but it can be set to about from 1 mg/L to 500 mg/L.

In the method for producing the dendritic copper powder 1 according to the present embodiment, for example, the dendritic copper powder is produced by precipitating and generating a copper powder on the cathode through electrolysis using the electrolytic solution having the composition as described above. A known method can be used as the electrolysis method. For example, the current density is preferably set to a range of from 3 $A/dm^2$ to 30 $A/dm^2$ upon electrolysis using an electrolytic solution exhibiting acidity by sulfuric acid, and an electric current is applied to the electrolytic solution being stirred. In addition, the liquid temperature (bath temperature) of the electrolytic solution can be set, for example, to about from 20° C. to 60° C.

<<3. Applications Such as Electrically Conductive Paste and Electrically Conductive Coating Material>>

The dendritic copper powder 1 according to the present embodiment has a dendritic shape having a main stem 2 and a plurality of branches 3 which have branched from the main stem 2 and is constituted as flat plate-shaped copper particles having a cross-sectional average thickness of from 0.02 μm to 5.0 μm gather as described above. Moreover, the average particle diameter (D50) of the dendritic copper powder is from 1.0 μm to 100 μm. Such a dendritic copper powder has a large surface area and exhibits excellent moldability and sinterability by having a dendritic shape, and the dendritic copper powder can secure a great number of contact points and exerts excellent electrical conductivity by having a dendritic shape and being constituted by flat plate-shaped copper particles having a predetermined cross-sectional average thickness.

Moreover, this dendritic copper powder 1 is a copper powder of which the growth in the vertical direction is suppressed, which thus has a smooth surface, and in which the maximum height in the vertical direction with respect to the flat plate-shaped surface of the copper particles is 1/10 or less with respect to the maximum length in the horizontal direction of the flat plate-shaped surface of the copper particles. According to such a dendritic copper powder 1, it is possible to further increase the number of contact points between the copper powders and to improve the electrical conductivity.

In addition, according to such a dendritic copper powder 1 having a predetermined structure, it is possible to suppress the aggregation of the copper powder, to uniformly disperse the copper powder in the resin, and to suppress the occurrence of poor printability and the like due to an increase in viscosity of the paste even in the case of being formed into a copper paste and the like. Consequently, the dendritic copper powder can be suitably used in applications such as an electrically conductive paste and an electrically conductive coating material.

For example, an electrically conductive paste (copper paste) can be fabricated by kneading the dendritic copper powder 1 according to the present embodiment to be contained as a metal filler (copper powder) with a binder resin and a solvent and, if necessary, further with additives such as an antioxidant and a coupling agent.

In the present embodiment, the metal filler is constituted so that the amount proportion of the dendritic copper powder described above therein is 20% by mass or more, preferably 30% by mass or more, and more preferably 50% by mass or more. When the proportion of the dendritic copper powder in the metal filler is set to 20% by mass or more, it is possible to uniformly disperse the metal filler in the resin and to prevent poor printability due to an excessive increase in viscosity of the paste, for example, in the case of using this metal filler in a copper paste. In addition, it is possible to exert excellent electrical conductivity as an electrically conductive paste as the dendritic copper powder 1 according to the present embodiment is a copper powder which is composed of an assembly of fine copper particles having a flat plate shape, of which the growth in the vertical direction with respect to the flat plate-shaped surface is suppressed, and which thus has a substantially smooth surface.

Incidentally, for example, a spherical copper powder having a size of about from 1 μm to 20 μm and the like may be mixed in the metal filler as other components as long as the metal filler contains the dendritic copper powder in an amount proportion of 20% by mass or more as described above.

Specifically, the binder resin is not particularly limited, but an epoxy resin, a phenol resin, and the like can be used. In addition, as the solvent, organic solvents such as ethylene glycol, diethylene glycol, triethylene glycol, glycerin, and terpineol can be used. In addition, the amount of the organic solvent added is not particularly limited, but the amount can be adjusted in consideration of the particle size of the dendritic copper powder so as to have a viscosity suitable for an electrically conductive film forming method by screen printing or a dispenser.

Furthermore, other resin components can also be added in order to adjust the viscosity. Examples thereof may include a cellulose-based resin typified by ethyl cellulose, and it is added as an organic vehicle dissolved in an organic solvent such as terpineol. Incidentally, the amount of the resin component added is required to be suppressed to an extent to which the sinterability is not inhibited, and it is preferably set to 5% by mass or less of the total mass.

In addition, as an additive, an antioxidant and the like can be added in order to improve the electrical conductivity after calcination. The antioxidant is not particularly limited, but examples thereof may include a hydroxycarboxylic acid. More specifically, hydroxycarboxylic acids such as citric acid, malic acid, tartaric acid, and lactic acid are preferable, and citric acid or malic acid exhibiting high adsorptive power to copper is particularly preferable. The amount of antioxidant added can be set to, for example, about from 1 to 15% by mass in consideration of the antioxidant effect, the viscosity of the paste, and the like.

Next, in the case of utilizing the dendritic copper powder 1 according to the present embodiment as a metal filler in a material for electromagnetic wave shielding as well, the metal filler is not limited to use under particularly limited conditions but can be used by a general method, for example, by being mixed with a resin.

For example, the resin to be used in order to form the electromagnetic wave shielding layer of an electrically conductive sheet for electromagnetic wave shielding is not particularly limited, and it is possible to appropriately use a thermoplastic resin, a thermosetting resin, a radiation-curing resin, and the like that have been conventionally used and are composed of various kinds of polymers and copolymers such as a vinyl chloride resin, a vinyl acetate resin, a vinylidene chloride resin, an acrylic resin, a polyurethane resin, a polyester resin, an olefin resin, a chlorinated olefin resin, a polyvinyl alcohol-based resin, an alkyd resin, and a phenol resin.

As the method for producing the electromagnetic wave shielding material, for example, the electromagnetic wave shielding material can be produced by applying or printing a coating material in which a metal filler and a resin as described above are dispersed or dissolved in a solvent on a substrate to form an electromagnetic wave shielding layer and drying the coating material to an extent to which the surface is solidified. In addition, it is also possible to utilize the metal filler in the electrically conductive adhesive layer of an electrically conductive sheet.

In addition, in the case of utilizing the dendritic copper powder 1 according to the present embodiment as a metal filler to form an electrically conductive coating material for electromagnetic wave shielding as well, the metal filler is not limited to use under particularly limited conditions but can be used as an electrically conductive coating material by a general method, for example, by being mixed with a resin and a solvent and, if necessary, further with an antioxidant, a thickener, an anti-settling agent, and the like and kneaded together.

The binder resin and solvent to be used at this time are also not particularly limited, and it is possible to utilize a vinyl chloride resin, a vinyl acetate resin, an acrylic resin, a polyester resin, a fluorocarbon resin, a silicone resin, a phenol resin, and the like that have been conventionally used. In addition, with regard to the solvent as well, it is possible to utilize an alcohol such as isopropanol, an aromatic hydrocarbon such as toluene, an ester such as methyl acetate, a ketone such as methyl ethyl ketone, and the like that have been conventionally used. In addition, with regard to the antioxidant as an additive as well, it is possible to utilize a fatty acid amide, a higher fatty acid amine, a phenylenediamine derivative, a titanate-based coupling agent, and the like that have been conventionally used.

EXAMPLES

Hereinafter, the present invention will be described more specifically with reference to Examples together with Comparative Examples, but the present invention is not limited to the following Examples at all.
<Evaluation Method>
The copper powders obtained in the following Examples and Comparative Examples were subjected to the observation of shape, the measurement of average particle diameter, the measurement of crystallite diameter, specific surface area, and the like by the following methods.
(Observation of Shape)
The copper powder contained in 20 arbitrary fields of vision in a field of vision at a predetermined magnification was observed through a scanning electron microscope (SEM) (model: JSM-7100F manufactured by JEOL Ltd.).
(Measurement of Average Particle Diameter)
The average particle diameter (D50) of the copper powder obtained was measured by using a laser diffraction/scattering method particle size distribution measuring instrument (HRA9320 X-100 manufactured by NIKKISO CO., LTD.).
(Measurement of Crystallite Diameter)
The crystallite diameter was calculated from the diffraction pattern obtained by using an X-ray diffraction measuring apparatus (X'Pert PRO manufactured by PANanalytical) by a known method to be generally known as the Scherrer equation.
(BET Specific Surface Area)
The BET specific surface area was measured by using a specific surface area and pore distribution measuring apparatus (QUADRASORB SI manufactured by Quantachrome Instruments).

(Measurement of Specific Resistance Value)

The specific resistance value of the coating film was determined by measuring the sheet resistance value by a four-terminal method using a low resistivity meter (Loresta-GP MCP-T600 manufactured by Mitsubishi Chemical Corporation) and the film thickness of the coating film by using a surface roughness and shape measuring instrument (SUR-FCOM 130A manufactured by TOKYO SEIMITSU CO., LTD.) and dividing the sheet resistance value by the film thickness.

(Electromagnetic Wave Shielding Property)

The evaluation on the electromagnetic wave shielding property was carried out by measuring the attenuation factor of the samples obtained in the respective Examples and Comparative Examples by using an electromagnetic wave having a frequency of 1 GHz. Specifically, the level in the case of Comparative Example 2 in which a dendritic copper powder was not used was evaluated as "Δ", a case in which the attenuation factor was worse than the level of Comparative Example 2 was evaluated as "X", a case in which the attenuation factor was more favorable than the level of Comparative Example 2 was evaluated as "○", and a case in which the attenuation factor was superior to the level of Comparative Example 2 was evaluated as "⊙".

In addition, it was confirmed whether the electromagnetic wave shielding property changed or not by bending the fabricated electromagnetic wave shield in order to evaluate the flexibility of the electromagnetic wave shield.

Example and Comparative Example

Example 1

A titanium electrode plate having an electrode area of 200 mm×200 mm and a copper electrode plate having an electrode area of 200 mm×200 mm were installed in an electrolytic cell having a capacity of 100 L as the cathode and the anode, respectively, an electrolytic solution was put into the electrolytic cell, and a direct current was applied to this, thereby precipitating a copper powder on the cathode plate.

At this time, a solution having composition in which the concentration of copper ion was 12 g/L and the concentration of sulfuric acid was 120 g/L was used as the electrolytic solution. In addition, a hydrochloric acid solution (manufactured by Wako Pure Chemical Industries, Ltd.) was added to this electrolytic solution so that the concentration of chloride ion (chlorine ion) in the electrolytic solution was 80 mg/L. In addition, safranin (manufactured by KANTO CHEMICAL CO., INC.) of a compound having a phenazine structure was added to this electrolytic solution as an additive so as to have a concentration of 100 mg/L in the electrolytic solution, and further, polyethylene glycol (PEG) (manufactured by Wako Pure Chemical Industries, Ltd.) having a molecular weight of 600 of a nonionic surfactant was added to this electrolytic solution so as to have a concentration of 500 mg/L in the electrolytic solution.

Thereafter, an electric current was applied to the electrolytic solution having a concentration adjusted as described above so that the current density of the cathode was 10 A/dm$^2$ while circulating the electrolytic solution at a flow rate of 15 L/min by using a metering pump and maintaining the temperature at 25° C., thereby precipitating a copper powder on the cathode plate.

The electrolytic copper powder precipitated on the cathode plate was mechanically scraped off to the cell bottom of the electrolytic cell by using a scraper and recovered, and the copper powder thus recovered was washed with pure water, then placed in a vacuum dryer, and dried.

The shape of the electrolytic copper powder thus obtained was observed by the above-described method using a scanning electron microscope (SEM), and as a result, at least 90% by number or more of the copper powders in the copper powders thus precipitated was a copper powder in which flat plate-shaped copper particles densely gathered and the copper particles grew into a dendritic shape and which thus had a dendritic shape.

In addition, while observing the dendritic copper powder thus obtained through a SEM, the cross-sectional average thickness of the flat plate-shaped copper particles and the ratio of the maximum length grown in the vertical direction with respect to the flat plate-shaped surface of the copper powder to the length of major axis in the horizontal direction with respect to the flat plate-shaped surface were measured. As a result, the copper particles constituting the copper powder thus obtained had a flat plate shape having a cross-sectional average thickness of 2.1 μm. In addition, the average particle diameter (D50) of the dendritic copper powder was 78.9 μm. Moreover, the ratio (length in vertical direction/length of major axis in flat plate direction) of the maximum length grown in the vertical direction from the flat plate-shaped surface of the copper powder to the maximum length in the horizontal direction (flat plate direction) with respect to the flat plate-shaped surface was 0.054 on average.

In addition, the bulk density of the dendritic copper powder thus obtained was 3.2 g/cm$^3$. In addition, the crystallite diameter of the dendritic copper powder was 243 nm. In addition, the BET specific surface area thereof was 1.29 m$^2$/g.

From these results of Example 1, it has been found that it is possible to fabricate a dendritic copper powder of which the growth in the vertical direction is suppressed and which thus has a flat plate shape by adding a compound having a phenazine structure and a nonionic surfactant to the electrolytic solution.

Example 2

A hydrochloric acid solution (manufactured by Wako Pure Chemical Industries, Ltd.) was added to the electrolytic solution so that the concentration of chloride ion was 200 mg/L in the electrolytic solution, and methyl orange (manufactured by KANTO CHEMICAL CO., INC.) of a compound having an azobenzene structure was added to the electrolytic solution as an additive so as to have a concentration of 200 mg/L in the electrolytic solution. Furthermore, polyoxyethylene polyoxypropylene butyl ether (trade name: UNILUBE 50 MB-11 manufactured by NOF CORPORATION) having a molecular weight of 1000 of a nonionic surfactant was added to the electrolytic solution so as to have a concentration of 750 mg/L in the electrolytic solution. A dendritic copper powder was fabricated by conducting the electrolytic treatment under the same conditions as in Example 1 other than these.

The shape of the copper powder thus obtained was observed by the above-described method using a scanning electron microscope (SEM), and as a result, at least 90% by number or more of the copper powders in the copper powders thus precipitated was a copper powder in which flat plate-shaped copper particles densely gathered and the copper particles grew into a dendritic shape and which thus had a dendritic shape.

In addition, while observing the dendritic copper powder thus obtained through a SEM, the cross-sectional average thickness of the flat plate-shaped copper particles and the ratio of the maximum length grown in the vertical direction with respect to the flat plate-shaped surface of the copper powder to the length of major axis in the horizontal direction with respect to the flat plate-shaped surface were measured. As a result, the copper particles constituting the copper powder thus obtained had a flat plate shape having a cross-sectional average thickness of 2.4 µm. In addition, the average particle diameter (D50) of the dendritic copper powder was 52.6 µm. Moreover, the ratio (length in vertical direction/length of major axis in flat plate direction) of the maximum length grown in the vertical direction from the flat plate-shaped surface of the copper powder to the maximum length in the horizontal direction with respect to the flat plate-shaped surface was 0.043 on average.

In addition, the bulk density of the dendritic copper powder thus obtained was 2.8 g/cm$^3$. In addition, the crystallite diameter of the dendritic copper powder was 270 nm. In addition, the BET specific surface area thereof was 1.94 m$^2$/g.

From these results of Example 2, it has been found that it is possible to fabricate a dendritic copper powder of which the growth in the vertical direction is suppressed and which thus has a flat plate shape by adding a compound having an azobenzene structure and a nonionic surfactant to the electrolytic solution.

Example 3

A hydrochloric acid solution (manufactured by Wako Pure Chemical Industries, Ltd.) was added to the electrolytic solution so that the concentration of chloride ion was 100 mg/L in the electrolytic solution, and Janus Green B (manufactured by KANTO CHEMICAL CO., INC.) of a compound having a phenazine structure and an azobenzene structure was added to the electrolytic solution as an additive so as to have a concentration of 500 mg/L in the electrolytic solution. Furthermore, polyoxyethylene polyoxypropylene butyl ether (trade name: UNILUB 50 MB-72, manufactured by NOF CORPORATION) having a molecular weight of 3000 of a nonionic surfactant was added to the electrolytic solution so as to have a concentration of 1000 mg/L in the electrolytic solution. A dendritic copper powder was fabricated by conducting the electrolytic treatment under the same conditions as in Example 1 other than these.

The shape of the copper powder thus obtained was observed by the above-described method using a scanning electron microscope (SEM), and as a result, at least 90% by number or more of the copper powders in the copper powders thus precipitated was a copper powder in which flat plate-shaped copper particles densely gathered and the copper particles grew into a dendritic shape and which thus had a dendritic shape.

In addition, while observing the dendritic copper powder thus obtained through a SEM, the cross-sectional average thickness of the flat plate-shaped copper particles and the ratio of the maximum length grown in the vertical direction with respect to the flat plate-shaped surface of the copper powder to the length of major axis in the horizontal direction with respect to the flat plate-shaped surface were measured. As a result, the copper particles constituting the copper powder thus obtained had a flat plate shape having a cross-sectional average thickness of 1.8 µm. In addition, the average particle diameter (D50) of the dendritic copper powder was 42.6 µm. Moreover, the ratio (length in vertical direction/length of major axis in flat plate direction) of the maximum length grown in the vertical direction from the flat plate-shaped surface of the copper powder to the maximum length in the horizontal direction with respect to the flat plate-shaped surface was 0.049 on average.

In addition, the bulk density of the dendritic copper powder thus obtained was 2.3 g/cm$^3$. In addition, the crystallite diameter of the dendritic copper powder was 184 nm. In addition, the BET specific surface area thereof was 2.13 m$^2$/g.

From these results of Example 3, it has been found that it is possible to fabricate a dendritic copper powder of which the growth in the vertical direction is suppressed and which thus has a flat plate shape by adding a compound having a phenazine structure and an azobenzene structure and a nonionic surfactant to the electrolytic solution.

Example 4

A hydrochloric acid solution (manufactured by Wako Pure Chemical Industries, Ltd.) was added to the electrolytic solution so that the concentration of chloride ion was 100 mg/L in the electrolytic solution, methyl orange (manufactured by KANTO CHEMICAL CO., INC.) of a compound having an azobenzene structure was added to the electrolytic solution as an additive so as to have a concentration of 100 mg/L in the electrolytic solution, and further Janus Green B (manufactured by KANTO CHEMICAL CO., INC.) of a compound having a phenazine structure and an azobenzene structure was added to the electrolytic solution as an additive so as to have a concentration of 100 mg/L in the electrolytic solution. In addition, polyethylene glycol (PEG) (manufactured by Wako Pure Chemical Industries, Ltd.) having a molecular weight of 600 of a nonionic surfactant was added to the electrolytic solution so as to have a concentration of 1000 mg/L in the electrolytic solution, further polyoxyethylene polyoxypropylene butyl ether (trade name: UNILUB 50 MB-72, manufactured by NOF CORPORATION) having a molecular weight of 3000 of a nonionic surfactant was added to the electrolytic solution so as to have a concentration of 1000 mg/L in the electrolytic solution. A dendritic copper powder was fabricated by conducting the electrolytic treatment under the same conditions as in Example 1 other than these.

The shape of the copper powder thus obtained was observed by the above-described method using a scanning electron microscope (SEM), and as a result, at least 90% by number or more of the copper powders in the copper powders thus precipitated was a copper powder in which flat plate-shaped copper particles densely gathered and the copper particles grew into a dendritic shape and which thus had a dendritic shape.

In addition, while observing the dendritic copper powder thus obtained through a SEM, the cross-sectional average thickness of the flat plate-shaped copper particles and the ratio of the maximum length grown in the vertical direction with respect to the flat plate-shaped surface of the copper powder to the length of major axis in the horizontal direction with respect to the flat plate-shaped surface were measured. As a result, the copper particles constituting the copper powder thus obtained had a flat plate shape having a cross-sectional average thickness of 0.6 µm. In addition, the average particle diameter (D50) of the dendritic copper powder was 22.5 µm. Moreover, the ratio (length in vertical direction/length of major axis in flat plate direction) of the maximum length grown in the vertical direction from the flat plate-shaped surface of the copper powder to the maximum length in the horizontal direction with respect to the flat plate-shaped surface was 0.068 on average.

In addition, the bulk density of the dendritic copper powder thus obtained was 1.0 g/cm$^3$. In addition, the crystallite diameter of the dendritic copper powder was 124 nm. In addition, the BET specific surface area thereof was 2.96 m$^2$/g.

From these results of Example 4, it has been found that it is possible to fabricate a dendritic copper powder of which the growth in the vertical direction is suppressed and which thus has a flat plate shape by adding a compound having an azobenzene structure and a compound having a phenazine structure and an azobenzene structure as additives in mixture and two or more kinds of nonionic surfactants to the electrolytic solution.

Example 5

With 55 parts by mass of the dendritic copper powder which had a specific surface area of 1.29 m$^2$/g and was obtained in Example 1, 15 parts by mass of a phenol resin (PL-2211 manufactured by Gunei Chemical Industry Co., Ltd.) and 10 parts by mass of butyl cellosolve (KANTO CHEMICAL CO., INC. Cica Special Grade), were mixed and the mixture was repeatedly kneaded by using a small kneader (Non-bubbling Kneader NBK-1 manufactured by NIHONSEIKI KAISHA LTD.) at 1200 rpm for 3 minutes three times to be formed into a paste. The electrically conductive paste thus obtained was printed on glass by using a metal squeegee and cured for 30 minutes at temperatures of 150° C. and 200° C. in the air atmosphere, respectively.

The specific resistance value of the coating film obtained by curing was 7.6×10$^{-5}$ Ω·cm (curing temperature: 150° C.) and 2.6×10$^{-5}$ Ω·cm (curing temperature: 200° C.), respectively.

Example 6

With 55 parts by mass of the dendritic copper powder which had a specific surface area of 1.94 m$^2$/g and was obtained in Example 2, 15 parts by mass of a phenol resin (PL-2211 manufactured by Gunei Chemical Industry Co., Ltd.) and 10 parts by mass of butyl cellosolve (KANTO CHEMICAL CO., INC. Cica Special Grade), were mixed and the mixture was repeatedly kneaded by using a small kneader (Non-bubbling Kneader NBK-1 manufactured by NIHONSEIKI KAISHA LTD.) at 1200 rpm for 3 minutes three times to be formed into a paste. The electrically conductive paste thus obtained was printed on glass by using a metal squeegee and cured for 30 minutes at temperatures of 150° C. and 200° C. in the air atmosphere, respectively.

The specific resistance value of the coating film obtained by curing was 7.8×10$^{-5}$ Ω·cm (curing temperature: 150° C.) and 3.1×10$^{-5}$ Ω·cm (curing temperature: 200° C.), respectively.

Example 7

With 55 parts by mass of the dendritic copper powder which had a specific surface area of 2.13 m$^2$/g and was obtained in Example 3, 15 parts by mass of a phenol resin (PL-2211 manufactured by Gunei Chemical Industry Co., Ltd.) and 10 parts by mass of butyl cellosolve (KANTO CHEMICAL CO., INC. Cica Special Grade), were mixed and the mixture was repeatedly kneaded by using a small kneader (Non-bubbling Kneader NBK-1 manufactured by NIHONSEIKI KAISHA LTD.) at 1200 rpm for 3 minutes three times to be formed into a paste. The electrically conductive paste thus obtained was printed on glass by using a metal squeegee and cured for 30 minutes at temperatures of 150° C. and 200° C. in the air atmosphere, respectively.

The specific resistance value of the coating film obtained by curing was 5.5×10$^{-5}$ Ω·cm (curing temperature: 150° C.) and 1.2×10$^{-5}$ Ω·cm (curing temperature: 200° C.), respectively.

Example 8

With 55 parts by mass (total amount) of dendritic copper powder in which two different kinds of dendritic copper powders of the dendritic copper powder which had a specific surface area of 1.29 m$^2$/g and was obtained in Example 1 and the dendritic copper powder which had a specific surface area of 1.94 m$^2$/g and was obtained in Example 2 were mixed at a proportion of 50:50, 15 parts by mass of a phenol resin (PL-2211 manufactured by Gunei Chemical Industry Co., Ltd.) and 10 parts by mass of butyl cellosolve (KANTO CHEMICAL CO., INC. Cica Special Grade), were mixed and the mixture was repeatedly kneaded by using a small kneader (Non-bubbling Kneader NBK-1 manufactured by NIHONSEIKI KAISHA LTD.) at 1200 rpm for 3 minutes three times to be formed into a paste. The electrically conductive paste thus obtained was printed on glass by using a metal squeegee and cured for 30 minutes at temperatures of 150° C. and 200° C. in the air atmosphere, respectively.

The specific resistance value of the coating film obtained by curing was 5.5×10$^{-5}$ Ω·cm (curing temperature: 150° C.) and 1.0×10$^{-5}$ Ω·cm (curing temperature: 200° C.), respectively.

Example 9

The dendritic copper powder which had a specific surface area of 1.29 m$^2$/g and was obtained in Example 1 was dispersed in a resin to prepare an electromagnetic wave shielding material.

In other words, 100 g of a vinyl chloride resin and 200 g of methyl ethyl ketone were respectively mixed with 40 g of the dendritic copper powder obtained in Example 1 and the mixture was repeatedly kneaded by using a small kneader at 1200 rpm for 3 minutes three times to be formed into a paste. When forming a paste, the copper powder was uniformly dispersed in the resin without aggregating. This was applied on a substrate formed of a transparent polyethylene terephthalate sheet having a thickness of 100 μm by using a Mayer bar and dried to form an electromagnetic wave shielding layer having a thickness of 25 μm.

The electromagnetic wave shielding property was evaluated by measuring the attenuation factor by using an electromagnetic wave having a frequency of 1 GHz. The evaluation results on the properties are presented in Table 1.

Example 10

The dendritic copper powder which had a specific surface area of 1.94 m$^2$/g and was obtained in Example 2 was dispersed in a resin to prepare an electromagnetic wave shielding material.

In other words, 100 g of a vinyl chloride resin and 200 g of methyl ethyl ketone were respectively mixed with 40 g of the dendritic copper powder obtained in Example 2 and the mixture was repeatedly kneaded by using a small kneader at 1200 rpm for 3 minutes three times to be formed into a paste. When forming a paste, the copper powder was uniformly dispersed in the resin without aggregating. This was applied on a substrate formed of a transparent polyethylene terephthalate sheet having a thickness of 100 μm by using a Mayer bar and dried to form an electromagnetic wave shielding layer having a thickness of 25 μm.

The electromagnetic wave shielding property was evaluated by measuring the attenuation factor by using an electromagnetic wave having a frequency of 1 GHz. The evaluation results on the properties are presented in Table 1.

Example 11

The dendritic copper powder which had a specific surface area of 2.13 m²/g and was obtained in Example 3 was dispersed in a resin to prepare an electromagnetic wave shielding material.

In other words, 100 g of a vinyl chloride resin and 200 g of methyl ethyl ketone were respectively mixed with 40 g of the dendritic copper powder obtained in Example 3 and the mixture was repeatedly kneaded by using a small kneader at 1200 rpm for 3 minutes three times to be formed into a paste. When forming a paste, the copper powder was uniformly dispersed in the resin without aggregating. This was applied on a substrate formed of a transparent polyethylene terephthalate sheet having a thickness of 100 μm by using a Mayer bar and dried to form an electromagnetic wave shielding layer having a thickness of 25 μm.

The electromagnetic wave shielding property was evaluated by measuring the attenuation factor by using an electromagnetic wave having a frequency of 1 GHz. The evaluation results on the properties are presented in Table 1.

Comparative Example 1

A copper powder was precipitated on the cathode plate under the same conditions except that safranin of a compound having a phenazine structure as an additive and polyethylene glycol (PEG) having a molecular weight of 600 of a nonionic surfactant were not added to the electrolytic solution in the conditions of Example 1.

The shape of the electrolytic copper powder thus obtained was observed by the method using a SEM described above, and as a result, the copper powder thus obtained had a dendritic shape, but it was constituted as granular copper particles gathered and was not a dendritic copper powder having a flat plate shape. In addition, the specific surface area of the copper powder thus obtained was 0.16 m²/g.

Next, 15 parts by mass of a phenol resin (PL-2211 manufactured by Gunei Chemical Industry Co., Ltd.) and 10 parts by mass of butyl cellosolve (KANTO CHEMICAL CO., INC. Cica Special Grade), were mixed with 55 parts by mass of the dendritic copper powder thus obtained and the mixture was repeatedly kneaded by using a small kneader (Non-bubbling Kneader NBK-1 manufactured by NIHONSEIKI KAISHA LTD.) at 1200 rpm for 3 minutes three times to be formed into a paste. The electrically conductive paste thus obtained was printed on glass by using a metal squeegee and cured for 30 minutes at temperatures of 150° C. and 200° C. in the air atmosphere, respectively.

The specific resistance value of the coating film obtained by curing was 14.5×10⁻⁵ Ω·cm (curing temperature: 150° C.) and 8.1×10⁻⁵ Ω·cm (curing temperature: 200° C.), respectively.

Comparative Example 2

The dendritic copper powder obtained in Comparative Example 1 was dispersed in a resin to prepare an electromagnetic wave shielding material.

In other words, 100 g of a vinyl chloride resin and 200 g of methyl ethyl ketone were respectively mixed with 40 g of the dendritic copper powder obtained in Comparative Example 1 set to the conditions in which safranin as an additive and a nonionic surfactant were not added in Example 1, and the mixture was repeatedly kneaded by using a small kneader at 1200 rpm for 3 minutes three times to be formed into a paste. When forming a paste, the copper powder was uniformly dispersed in the resin without aggregating. This was applied on a substrate formed of a transparent polyethylene terephthalate sheet having a thickness of 100 μm by using a Mayer bar and dried to form an electromagnetic wave shielding layer having a thickness of 25 μm.

The electromagnetic wave shielding property was evaluated by measuring the attenuation factor by using an electromagnetic wave having a frequency of 1 GHz. The evaluation results on the properties are presented in Table 1.

TABLE 1

| | Dendritic copper powder | | | Properties of electrically conductive paste [×10⁻⁵ Ω·cm] | | Properties of electromagnetic wave shield | |
|---|---|---|---|---|---|---|---|
| | [1] Specific surface area [m²/g] | [2] Specific surface area [m²/g] | Mixing rate [%] ([1]/[2]) | 150° C. | 200° C. | Plane | Bending |
| Example 5 | 1.29 | — | 100/0 | 7.6 | 2.6 | — | — |
| Example 6 | 1.94 | — | 100/0 | 7.8 | 3.1 | — | — |
| Example 7 | 2.13 | — | 100/0 | 5.5 | 1.2 | — | — |
| Example 8 | 1.29 | 1.94 | 50/50 | 5.5 | 1.0 | — | — |
| Example 9 | 1.29 | — | 100/0 | — | — | ⊙ | ○ |
| Example 10 | 1.94 | — | 100/0 | — | — | ⊙ | ○ |
| Example 11 | 2.13 | — | 100/0 | — | — | ⊙ | ○ |
| Comparative Example 1 | 0.16 | — | 100/0 | 14.5 | 8.1 | — | — |
| Comparative Example 2 | 0.16 | — | 100/0 | — | — | Δ | X |

EXPLANATION OF REFERENCE NUMERALS 1 (Dendritic) copper powder
2 Main stem
3, 3a, 3b Branch
4 Maximum length in horizontal direction (X-Y direction) with respect to flat plate-shaped surface
5 Maximum height in vertical direction with respect to flat plate-shaped surface (X-Y surface)

The invention claimed is:
1. A copper powder having a dendritic shape having a linearly grown main stem and a plurality of branches separated from the main stem, wherein
 the main stem and the branches are constituted as flat plate-shaped copper particles having a cross-sectional average thickness of from 0.02 μm to 5.0 μm to be determined by scanning electron microscopic (SEM) observation gather,
 an average particle diameter (D50) of the copper powder is from 1.0 μm to 100 μm, and
 a maximum height in a vertical direction with respect to a flat plate-shaped surface of the copper particles is 1/10 or less with respect to a maximum length in a horizontal direction of the flat plate-shaped surface.

2. The copper powder according to claim 1, wherein a bulk density of the copper powder is in a range of from 0.5 g/cm$^3$ to 5.0 g/cm$^3$.

3. The copper powder according to claim 1, wherein a BET specific surface area value of the copper powder is from 0.2 m$^2$/g to 5.0 m$^2$/g.

4. The copper powder according to claim 1, wherein a crystallite diameter by the Miller indices of a (111) plane by X-ray diffraction is in a range of from 80 nm to 300 nm.

5. A metal filler comprising the copper powder according to claim 1 at a proportion of 20% by mass or more of the entire metal filler.

6. A copper paste comprising the metal filler according to claim 5 mixed with a resin.

7. An electrically conductive coating material for electromagnetic wave shielding comprising the metal filler according to claim 5.

8. An electrically conductive sheet for electromagnetic wave shielding comprising the metal filler according to claim 5.

9. A method for producing the copper powder according to claim 1, wherein electrolysis is conducted by using an electrolytic solution containing a copper ion, one or more kinds of compounds which have a phenazine structure and are represented by the following Formula (1), and one or more kinds of nonionic surfactants:

[Chem. 1]

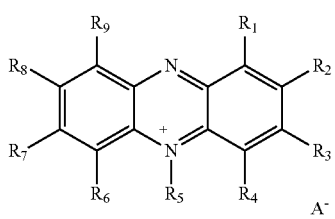

(1)

[in Formula (1), R$_1$, R$_2$, R$_3$, R$_4$, R$_6$, R$_7$, R$_8$, and R$_9$ are each independently a group selected from the group consisting of hydrogen, a halogen, amino, OH, =O, CN, SCN, SH, COOH, a COO salt, a COO ester, SO$_3$H, a SO$_3$ salt, a SO$_3$ ester, benzenesulfonic acid, and a C1 to C8 alkyl, R$_5$ is a group selected from the group consisting of hydrogen, a halogen, amino, OH, =O, CN, SCN, SH, COOH, a COO salt, a COO ester, SO$_3$H, a SO$_3$ salt, a SO$_3$ ester, benzenesulfonic acid, a lower alkyl, and an aryl, and A$^-$ is a halide anion].

10. A method for producing the copper powder according to claim 1, wherein electrolysis is conducted by using an electrolytic solution containing a copper ion, one or more kinds of compounds which have an azobenzene structure and are represented by the following Formula (2), and one or more kinds of nonionic surfactants:

[Chem. 2]

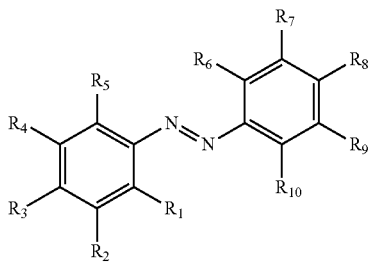

(2)

[in Formula (2), R$_1$, R$_2$, R$_3$, R$_4$, R$_5$, R$_6$, R$_7$, R$_8$, R$_9$, and R$_{10}$ are each independently a group selected from the group consisting of hydrogen, a halogen, amino, OH, =O, CN, SCN, SH, COOH, a COO salt, a COO ester, SO$_3$H, a SO$_3$ salt, a SO$_3$ ester, benzenesulfonic acid, a lower alkyl, and an aryl].

11. A method for producing the copper powder according to claim 1, wherein electrolysis is conducted by using an electrolytic solution containing a copper ion, one or more kinds of compounds which have a phenazine structure and an azobenzene structure and are represented by the following Formula (3), and one or more kinds of nonionic surfactants:

[Chem. 3]

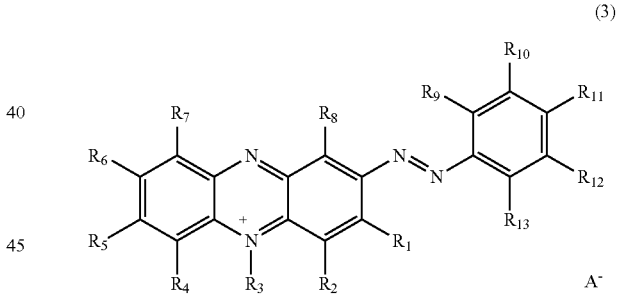

(3)

[in Formula (3), R$_1$, R$_2$, R$_4$, R$_5$, R$_6$, R$_7$, R$_8$, R$_9$, R$_{10}$, R$_{11}$, R$_{12}$, and R$_{13}$ are each independently a group selected from the group consisting of hydrogen, a halogen, amino, OH, =O, CN, SCN, SH, COOH, a COO salt, a COO ester, SO$_3$H, a SO$_3$ salt, a SO$_3$ ester, benzenesulfonic acid, and a C1 to C8 alkyl, R$_3$ is a group selected from the group consisting of hydrogen, a halogen, amino, OH, =O, CN, SCN, SH, COOH, a COO salt, a COO ester, SO$_3$H, a SO$_3$ salt, a SO$_3$ ester, benzenesulfonic acid, a lower alkyl, and an aryl, and A$^-$ is a halide anion].

12. A method for producing the copper powder according to claim 1, wherein electrolysis is conducted by using an electrolytic solution containing a copper ion, two or more kinds selected from the group consisting of a compound which has a phenazine structure and is represented by the following Formula (1), a compound which has an azobenzene structure and is represented by the following Formula (2), and a compound which has a phenazine structure and an azobenzene structure and is represented by the following Formula (3), and one or more kinds of nonionic surfactants:

[Chem. 1]

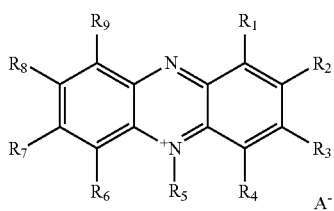

(1)

[in Formula (1), $R_1$, $R_2$, $R_3$, $R_4$, $R_6$, $R_7$, $R_8$, and $R_9$ are each independently a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, and a C1 to C8 alkyl, $R_5$ is a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, a lower alkyl, and an aryl, and $A^-$ is a halide anion],

[Chem. 2]

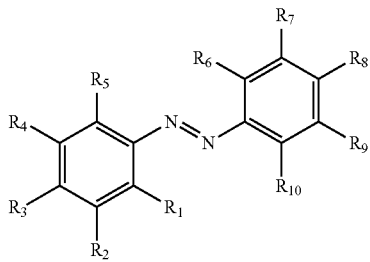

(2)

[in Formula (2), $R_1$, $R_2$, $R_3$, $R_4$, $R_5$, $R_6$, $R_7$, $R_8$, $R_9$, and $R_{10}$ are each independently a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, a lower alkyl, and an aryl]

[Chem. 3]

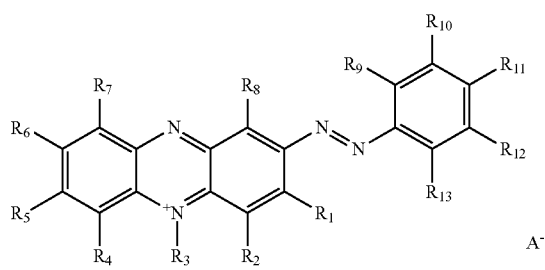

(3)

[in Formula (3), $R_1$, $R_2$, $R_4$, $R_5$, $R_6$, $R_7$, $R_8$, $R_9$, $R_{10}$, $R_{11}$, $R_{12}$, and $R_{13}$ are each independently a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, and a C1 to C8 alkyl, $R_3$ is a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, a lower alkyl, and an aryl, and $A^-$ is a halide anion].

13. The copper powder according to claim 2, wherein a BET specific surface area value of the copper powder is from 0.2 m²/g to 5.0 m²/g.

14. The copper powder according to claim 2, wherein a crystallite diameter by the Miller indices of a (111) plane by X-ray diffraction is in a range of from 80 nm to 300 nm.

15. A metal filler comprising the copper powder according to claim 2 at a proportion of 20% by mass or more of the entire metal filler.

16. A method for producing the copper powder according to claim 2, wherein electrolysis is conducted by using an electrolytic solution containing a copper ion, one or more kinds of compounds which have a phenazine structure and are represented by the following Formula (1), and one or more kinds of nonionic surfactants:

[Chem. 1]

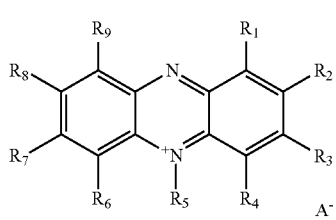

(1)

[in Formula (1), $R_1$, $R_2$, $R_3$, $R_4$, $R_6$, $R_7$, $R_8$, and $R_9$ are each independently a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, and a C1 to C8 alkyl, $R_5$ is a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, a lower alkyl, and an aryl, and $A^-$ is a halide anion].

17. A method for producing the copper powder according to claim 3, wherein electrolysis is conducted by using an electrolytic solution containing a copper ion, one or more kinds of compounds which have a phenazine structure and are represented by the following Formula (1), and one or more kinds of nonionic surfactants:

[Chem. 1]

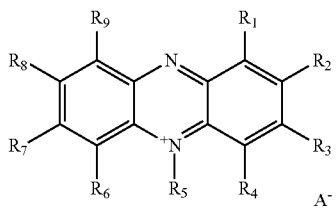

(1)

[in Formula (1), $R_1$, $R_2$, $R_3$, $R_4$, $R_6$, $R_7$, $R_8$, and $R_9$ are each independently a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, and a C1 to C8 alkyl, $R_5$ is a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, a lower alkyl, and an aryl, and $A^-$ is a halide anion].

18. A method for producing the copper powder according to claim 2, wherein electrolysis is conducted by using an electrolytic solution containing a copper ion, one or more kinds of compounds which have an azobenzene structure and are represented by the following Formula (2), and one or more kinds of nonionic surfactants:

[Chem. 2]

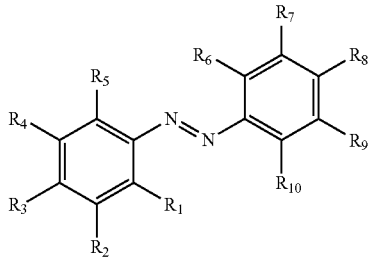

(2)

[in Formula (2), $R_1$, $R_2$, $R_3$, $R_4$, $R_5$, $R_6$, $R_7$, $R_8$, $R_9$, and $R_{10}$ are each independently a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, a lower alkyl, and an aryl].

19. A method for producing the copper powder according to claim 2, wherein electrolysis is conducted by using an electrolytic solution containing a copper ion, one or more kinds of compounds which have a phenazine structure and an azobenzene structure and are represented by the following Formula (3), and one or more kinds of nonionic surfactants:

[Chem. 3]

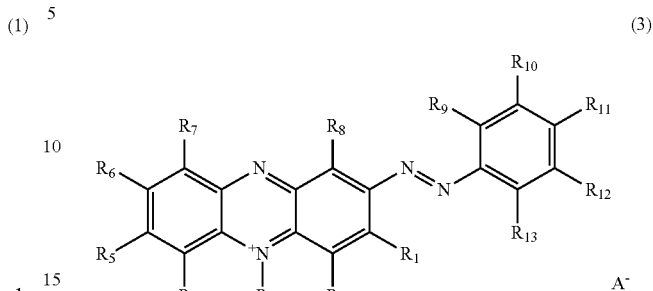

(3)

[in Formula (3), $R_1$, $R_2$, $R_4$, $R_5$, $R_6$, $R_7$, $R_8$, $R_9$, $R_{10}$, $R_{11}$, $R_{12}$, and $R_{13}$ are each independently a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, and a C1 to C8 alkyl, $R_3$ is a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, a lower alkyl, and an aryl, and $A^-$ is a halide anion].

20. A method for producing the copper powder according to claim 2, wherein electrolysis is conducted by using an electrolytic solution containing a copper ion, two or more kinds selected from the group consisting of a compound which has a phenazine structure and is represented by the following Formula (1), a compound which has an azobenzene structure and is represented by the following Formula (2), and a compound which has a phenazine structure and an azobenzene structure and is represented by the following Formula (3), and one or more kinds of nonionic surfactants:

[Chem. 1]

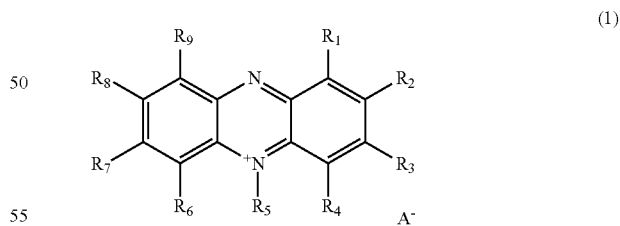

(1)

[in Formula (1), $R_1$, $R_2$, $R_3$, $R_4$, $R_6$, $R_7$, $R_8$, and $R_9$ are each independently a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, and a C1 to C8 alkyl, $R_5$ is a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, a lower alkyl, and an aryl, and $A^-$ is a halide anion]

[Chem. 2]

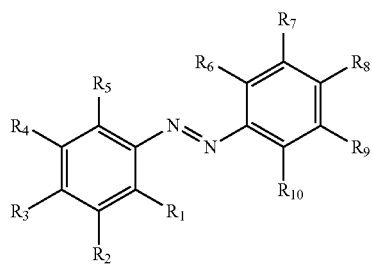

(2)

[in Formula (2), $R_1$, $R_2$, $R_3$, $R_4$, $R_5$, $R_6$, $R_7$, $R_8$, $R_9$, and $R_{10}$ are each independently a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, a lower alkyl, and an aryl],

[Chem. 3]

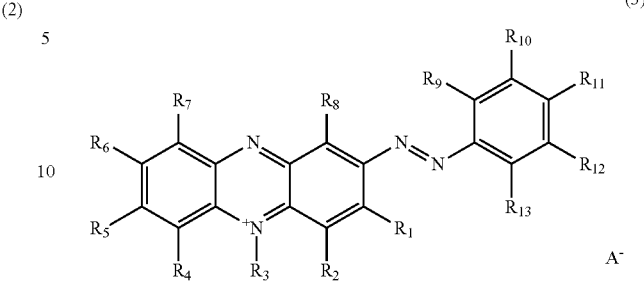

(3)

[in Formula (3), $R_1$, $R_2$, $R_4$, $R_5$, $R_6$, $R_7$, $R_8$, $R_9$, $R_{10}$, $R_{11}$, $R_{12}$, and $R_{13}$ are each independently a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, and a C1 to C8 alkyl, $R_3$ is a group selected from the group consisting of hydrogen, a halogen, amino, OH, =O, CN, SCN, SH, COOH, a COO salt, a COO ester, $SO_3H$, a $SO_3$ salt, a $SO_3$ ester, benzenesulfonic acid, a lower alkyl, and an aryl, and $A^-$ is a halide anion].

\* \* \* \* \*